US012399568B2

(12) United States Patent
Kies et al.

(10) Patent No.: US 12,399,568 B2
(45) Date of Patent: Aug. 26, 2025

(54) DYNAMIC CONFIGURATION OF USER INTERFACE LAYOUTS AND INPUTS FOR EXTENDED REALITY SYSTEMS

(71) Applicant: QUALCOMM Incorporated, San Diego, CA (US)

(72) Inventors: Jonathan Kies, Encinitas, CA (US); Chad Willkie, Cardiff by the Sea, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/481,029

(22) Filed: Sep. 21, 2021

(65) Prior Publication Data
US 2022/0100265 A1 Mar. 31, 2022

Related U.S. Application Data

(60) Provisional application No. 63/085,944, filed on Sep. 30, 2020.

(51) Int. Cl.
*G06F 3/04815* (2022.01)
*G06F 3/01* (2006.01)
(Continued)

(52) U.S. Cl.
CPC ............. *G06F 3/017* (2013.01); *G06F 3/011* (2013.01); *G06F 3/04815* (2013.01);
(Continued)

(58) Field of Classification Search
CPC ........ G06F 3/011; G06F 3/017; G06F 3/0304; G06F 3/04815; G06F 3/0485;
(Continued)

(56) References Cited

U.S. PATENT DOCUMENTS 10,754,418 B1 * 8/2020 Ruppert .................... G06T 7/70
11,023,035 B1 * 6/2021 Atlas ........................ G06F 3/014
(Continued)

FOREIGN PATENT DOCUMENTS

| EP | 3624066 A2 | 3/2020 |
| TW | 201235933 A | 9/2012 |
| WO | 2020039933 A1 | 2/2020 |

OTHER PUBLICATIONS

Datcu, D., Lukosch, S., & Brazier, F. (2015). On the usability and effectiveness of different interaction types in augmented reality. International Journal of Human-Computer Interaction, 31(3), 193-209. (Year: 2015).*

(Continued)

*Primary Examiner* — Linda Huynh
(74) *Attorney, Agent, or Firm* — Polsinelli/Qualcomm

(57) ABSTRACT

Systems and techniques are provided for generating virtual content. For example, a process can include obtaining an image of a physical object in a real-world environment and determining at least one attribute of the physical object in the image. The process can include determining an interface layout for virtual content based on the at least one attribute of the physical object. The process can include displaying the virtual content based on the determined interface layout. In some cases, the process can including determining an input type based on the at least one attribute of the physical object, receiving input corresponding to the input type, and controlling displayed virtual content based on the determined input type.

30 Claims, 12 Drawing Sheets

(51) Int. Cl.
*G06F 3/0485* (2022.01)
*G06T 19/00* (2011.01)
*G06V 20/20* (2022.01)
*G06V 40/10* (2022.01)

(52) U.S. Cl.
CPC .......... *G06F 3/0485* (2013.01); *G06T 19/006* (2013.01); *G06V 20/20* (2022.01); *G06V 40/107* (2022.01)

(58) Field of Classification Search
CPC . G06F 3/04855; G06F 3/0488; G06T 19/006; G06T 19/20; G06T 2200/24; G06V 20/10; G06V 20/20; G06V 40/107; G06V 40/28
See application file for complete search history.

(56) References Cited

U.S. PATENT DOCUMENTS

| | | | | |
|---|---|---|---|---|
| 2010/0045705 | A1* | 2/2010 | Vertegaal | G06F 1/1613 345/173 |
| 2010/0066763 | A1* | 3/2010 | MacDougall | G06F 1/1626 345/656 |
| 2012/0102438 | A1* | 4/2012 | Robinson | G06F 3/011 715/863 |
| 2012/0113223 | A1* | 5/2012 | Hilliges | G06F 3/011 348/46 |
| 2012/0250940 | A1* | 10/2012 | Kasahara | G06T 19/006 382/103 |
| 2013/0044128 | A1* | 2/2013 | Liu | G02B 27/017 345/633 |
| 2014/0225918 | A1* | 8/2014 | Mittal | G06T 19/006 345/633 |
| 2015/0243105 | A1* | 8/2015 | Abovitz | G02B 27/4205 345/633 |
| 2016/0071241 | A1* | 3/2016 | Karunamuni | G06F 3/04845 345/156 |
| 2017/0123487 | A1* | 5/2017 | Hazra | G06F 3/0482 |
| 2018/0218538 | A1* | 8/2018 | Short | G06V 20/20 |
| 2019/0121522 | A1* | 4/2019 | Davis | G06V 40/28 |
| 2019/0172266 | A1* | 6/2019 | Short | G06V 20/20 |
| 2020/0387213 | A1* | 12/2020 | Ravasz | G06F 3/011 |
| 2021/0081050 | A1* | 3/2021 | Zhou | G06F 3/017 |
| 2021/0165484 | A1* | 6/2021 | Suguhara | G06F 3/013 |

OTHER PUBLICATIONS

International Search Report and Written Opinion—PCT/US2021/051592—ISA/EPO—Jan. 7, 2022.
Taiwan Search Report—TW110135096—TIPO—Nov. 28, 2024.

* cited by examiner

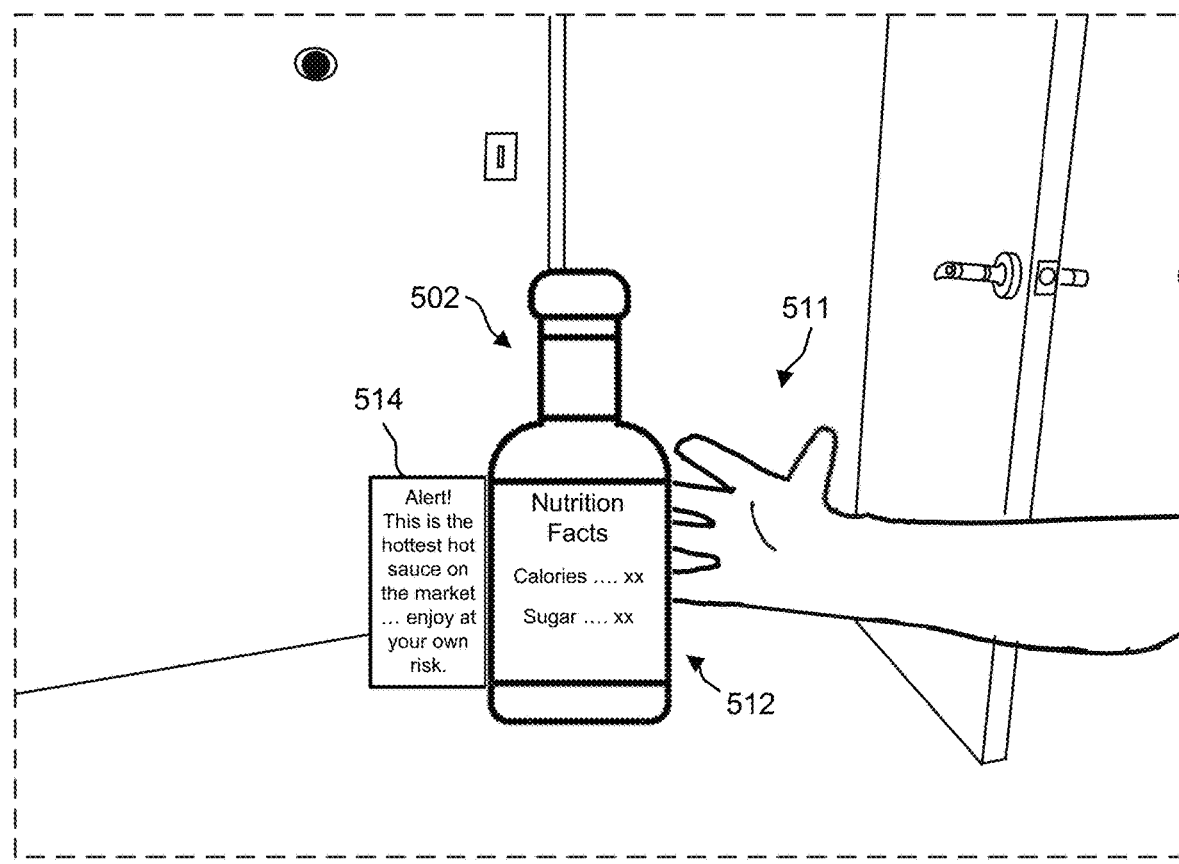
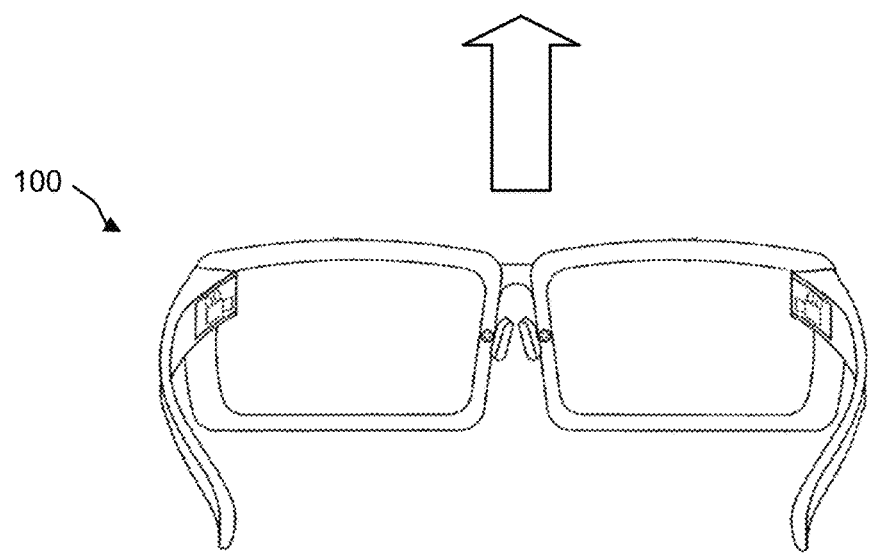
FIG. 5

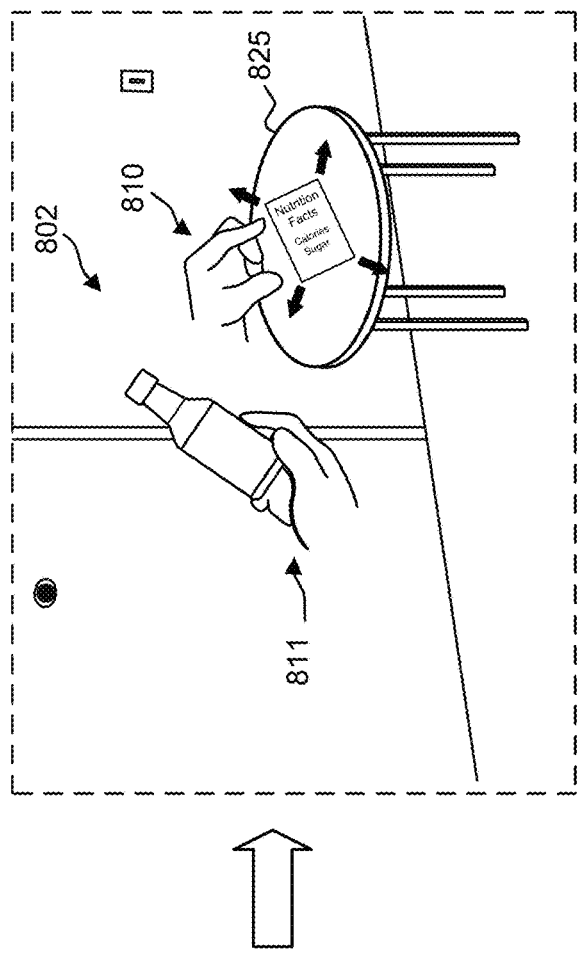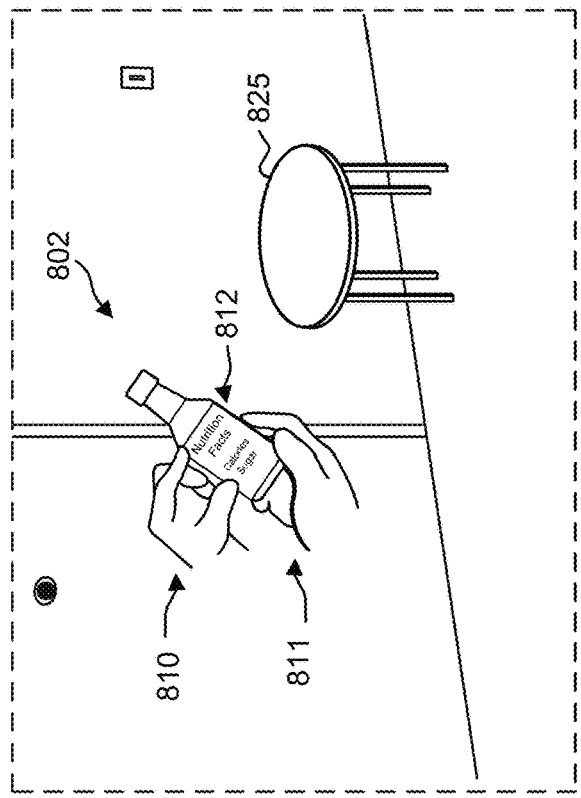
FIG. 8

900

Obtain, By A Device, An Image Of A Physical Object In A Real-World Environment
902

Determine, By The Device, At Least One Attribute Of The Physical Object In The Image
904

Determine, By The Device, An Interface Layout For Virtual Content Based On The At Least One Attribute Of The Physical Object
906

Display, By The Device, The Virtual Content Based On The Determined Interface Layout
908

Obtain, By A Device, An Image Of A Physical Object In A
Real-World Environment
1002

Determine, By The Device, At Least One Attribute Of The
Physical Object In The Image
1004

Determine, By The Device, An Input Type Based On The At
Least One Attribute Of The Physical Object
1006

Receive, By The Device, Input Corresponding To The Input
Type
1008

Control, By The Device, Displayed Virtual Content Based
On The Determined Input Type
1010

FIG. 10

DYNAMIC CONFIGURATION OF USER INTERFACE LAYOUTS AND INPUTS FOR EXTENDED REALITY SYSTEMS

CROSS-REFERENCE TO RELATED APPLICATIONS

The present application claims the benefit of U.S. Provisional Application No. 63/085,944, filed Sep. 30, 2020, entitled "DYNAMIC CONFIGURATION OF USER INTERFACE LAYOUTS AND INPUTS FOR EXTENDED REALITY SYSTEMS," which is hereby incorporated by reference in its entirety and for all purposes.

TECHNICAL FIELD

Aspects of the present disclosure generally relate to configuring user interface layouts and/or inputs for extended reality systems and/or other systems.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content.

Extended reality technologies can be implemented to enhance user experiences in a wide range of contexts, such as entertainment, healthcare, retail, education, social media, among others. In some cases, user interfaces of extended reality systems (e.g., augmented reality systems) can be difficult to use from the user perspective. Such user interfaces are not optimized for the objects that are being augmented.

SUMMARY

Disclosed are systems, apparatuses, methods, and computer-readable media for configuring user interface layouts and/or inputs for extended reality systems (and/or other systems) based on attributes of one or more physical objects in a real-world environment, based on attributes of a user relative to the one or more physical objects, and/or based on other factors. According to at least one example, a method is provided for generating virtual content. The method includes: obtaining, by a device, an image of a physical object in a real-world environment; determining, by the device, at least one attribute of the physical object in the image; determining an interface layout for virtual content based on the at least one attribute of the physical object; and displaying the virtual content based on the determined interface layout.

In another example, an apparatus for generating virtual content is provided that includes a memory (e.g., configured to store data, such as virtual content data, one or more images, etc.) and one or more processors (e.g., implemented in circuitry) coupled to the memory. The one or more processors are configured to and can: obtain an image of a physical object in a real-world environment; determine at least one attribute of the physical object in the image; determine an interface layout for virtual content based on the at least one attribute of the physical object; and cause the virtual content to be displayed based on the determined interface layout.

In another example, a non-transitory computer-readable medium is provided that has stored thereon instructions that, when executed by one or more processors, cause the one or more processors to: obtain an image of a physical object in a real-world environment; determine at least one attribute of the physical object in the image; determine an interface layout for virtual content based on the at least one attribute of the physical object; and cause the virtual content to be displayed based on the determined interface layout.

In another example, an apparatus for generating virtual content is provided. The apparatus includes: means for obtaining an image of a physical object in a real-world environment; means for determining at least one attribute of the physical object in the image; means for determining an interface layout for virtual content based on the at least one attribute of the physical object; and means for displaying the virtual content based on the determined interface layout.

In some aspects, the real-world environment is viewable through a display of the device or apparatus as the virtual content is displayed by the display.

In some aspects, the at least one attribute of the physical object includes at least one of a size of the physical object, a shape of the physical object, an orientation of the physical object with respect to the device or apparatus, a position of the physical object with respect to the device or apparatus, and an ability of the physical object to be held by a hand of a user.

In some aspects, one or more of the methods, apparatuses, and computer-readable medium described above further comprise: determining a body part of a user in one or more images; determining at least one attribute of the body part of the user in the one or more images; and determining the interface layout for the virtual content based on the at least one attribute of the physical object and the at least one attribute of the body part of the user.

In some aspects, the at least one attribute of the body part includes at least one of a size of the body part, an orientation of the body part relative to the physical object, a position of the body part relative to the physical object a position of the body part relative to the physical object, an orientation of the body part relative to the device or apparatus, and a position of the body part relative to the device or apparatus.

In some aspects, the body part of the user is a hand of the user, and the at least one attribute of the body part includes at least one of a size of the hand, an orientation of the hand relative to the physical object, a position of the hand relative to the physical object, an orientation of the hand relative to the device or apparatus, a position of the hand relative to the device or apparatus, and whether the hand is a left hand or a right hand of the user.

In some aspects, one or more of the methods, apparatuses, and computer-readable medium described above further comprise: determining a hand a user in one or more images; determining whether the hand is a left hand or a right hand of the user; and determining a position for the virtual content in the interface layout based on whether the hand is the left hand or the right hand of the user.

In some aspects, one or more of the methods, apparatuses, and computer-readable medium described above further comprise: determining the hand is the left hand of the user; determining, based on the hand being the left hand of the user, the position for the virtual content relative to a right side of the physical object; and displaying the virtual content in the interface layout relative to the right side of the physical object.

In some aspects, one or more of the methods, apparatuses, and computer-readable medium described above further comprise: determining the hand is the right hand of the user; determining, based on the hand being the right hand of the user, the position for the virtual content relative to a left side of the physical object; and displaying the virtual content in the interface layout relative to the left side of the physical object.

In some aspects, one or more of the methods, apparatuses, and computer-readable medium described above further comprise: determining the at least one attribute of the physical object in a plurality of images.

In some aspects, one or more of the methods, apparatuses, and computer-readable medium described above further comprise: determining an input type based on the at least one attribute of the physical object; receiving input corresponding to the input type; and controlling the displayed virtual content based on the input type. In some aspects, the input type includes a scrolling input. In some aspects, the input type includes a tap input.

In some aspects, one or more of the methods, apparatuses, and computer-readable medium described above further comprise: determining an input function for the input type based on the at least one attribute of the physical object; and controlling the displayed virtual content based on the determined input function for the input type.

According to another example, a method is provided for generating virtual content. The method includes: obtaining, by a device, an image of a physical object in a real-world environment; determining, by the device, at least one attribute of the physical object in the image; determining, by the device, an input type based on the at least one attribute of the physical object; receiving, by the device input corresponding to the input type; and controlling, by the device, displayed virtual content based on the determined input type.

In another example, an apparatus for generating virtual content is provided that includes a memory (e.g., configured to store data, such as virtual content data, one or more images, etc.) and one or more processors (e.g., implemented in circuitry) coupled to the memory. The one or more processors are configured to and can: obtain an image of a physical object in a real-world environment; determine at least one attribute of the physical object in the image; determine an input type based on the at least one attribute of the physical object; receive input corresponding to the input type; and control displayed virtual content based on the determined input type.

In another example, a non-transitory computer-readable medium is provided that has stored thereon instructions that, when executed by one or more processors, cause the one or more processors to: obtain an image of a physical object in a real-world environment; determine at least one attribute of the physical object in the image; determine an input type based on the at least one attribute of the physical object; receive input corresponding to the input type; and control displayed virtual content based on the determined input type.

In another example, an apparatus for generating virtual content is provided. The apparatus includes: means for obtaining an image of a physical object in a real-world environment; means for determining at least one attribute of the physical object in the image; means for determining an input type based on the at least one attribute of the physical object; receiving input corresponding to the input type; and means for controlling displayed virtual content based on the determined input type.

In some aspects, the real-world environment is viewable through a display of the device or apparatus as the virtual content is displayed by the display.

In some aspects, the at least one attribute of the physical object includes at least one of a size of the physical object, a shape of the physical object, an orientation of the physical object with respect to the device or apparatus, a position of the physical object with respect to the device or apparatus, and an ability of the physical object to be held by a hand of a user.

In some aspects, the input type includes a scrolling input. In some aspects, the input type includes a tap input.

In some aspects, one or more of the methods, apparatuses, and computer-readable medium described above further comprise: determining an input function for the input type based on the at least one attribute of the physical object; and controlling the displayed virtual content based on the determined input function for the input type.

In some aspects, the input type includes a scrolling input, and the input function includes an orientation of the scrolling input.

In some aspects, one or more of the methods, apparatuses, and computer-readable medium described above further comprise: determining a body part of a user in one or more images; determining at least one attribute of the body part of the user in the one or more images; and determining at least one of the input type or an input function for the input type based on the at least one attribute of the physical object and the at least one attribute of the body part of the user.

In some aspects, the at least one attribute of the body part includes at least one of a size of the body part, an orientation of the body part relative to the physical object, a position of the body part relative to the physical object a position of the body part relative to the physical object, an orientation of the body part relative to the device or apparatus, and a position of the body part relative to the device or apparatus.

In some aspects, the body part of the user is a hand of the user, and the at least one attribute of the body part includes at least one of a size of the hand, an orientation of the hand relative to the physical object, a position of the hand relative to the physical object, an orientation of the hand relative to the device or apparatus, a position of the hand relative to the device or apparatus, and whether the hand is a left hand or a right hand of the user.

In some aspects, one or more of the methods, apparatuses, and computer-readable medium described above further comprise: determining an interface layout for virtual content based on the at least one attribute of the physical object; and displaying the virtual content based on the determined interface layout.

In some aspects, one or more of the methods, apparatuses, and computer-readable medium described above further comprise: determining the at least one attribute of the physical object in a plurality of images.

In some aspects, the device or apparatus is, is part of, and/or includes an extended reality device (e.g., a virtual reality (VR) device, an augmented reality (AR) device, or a mixed reality (MR) device), a mobile device (e.g., a mobile telephone or so-called "smart phone" or other mobile device), a wearable device, a personal computer, a laptop computer, a server computer, a camera, a vehicle or a computing device or component of a vehicle, or other device. In some aspects, the apparatus includes a camera or multiple cameras for capturing one or more images. In some aspects, the apparatus includes a display for displaying one or more images, virtual content, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 5 is a diagram illustrating another example of virtual content being displayed relative to a real-world or physical object based on attributes of the object and/or attributes of a user, in accordance with some examples of the present disclosure;

FIG. 8 is a diagram illustrating an example of generating virtual content, in accordance with some examples of the present disclosure;

FIG. 9 is a flow diagram illustrating an example of a process for generating virtual content, in accordance with some examples of the present disclosure;

FIG. 10 illustrates an example computing system, in accordance with some examples of the present disclosure.

DETAILED DESCRIPTION

Figure 1:
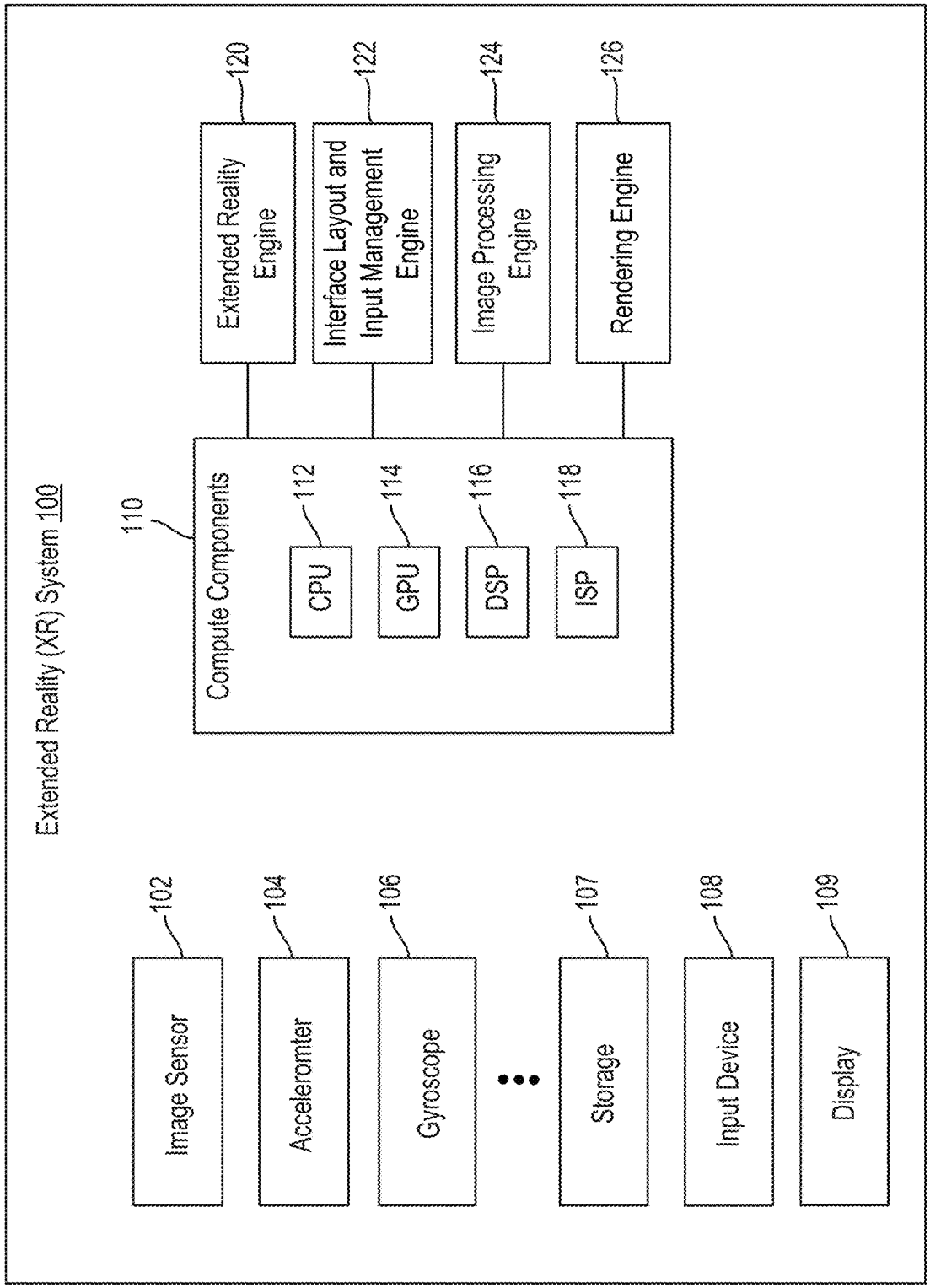
FIG. 1 is a block diagram illustrating an example extended reality system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include any virtual content, such as video, images, graphic content, location data (e.g., global positioning system (GPS) data or other location data), sounds, any combination thereof, and/or other augmented content. An AR system is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

Two types of AR systems that can be used to provide AR content include video see-through (also referred to as video pass-through) displays and optical see-through displays, which can both be used to enhance a user's visual perception of real-world or physical objects. In a video see-through system, a live video of a real-world scenario is displayed, including one or more objects augmented or enhanced on the live video. A video see-through system can be implemented using a mobile device (e.g., video on a mobile phone display), an HMD, or other suitable device that can display video and computer-generated objects over the video.

An optical see-through system with AR features can display AR content directly onto the real-world view without displaying video content. For example, the user may view physical objects through a display (e.g., glasses or lenses), and the AR system can display AR content (e.g., projected or otherwise displayed) onto the display to provide the user with an enhanced visual perception of one or more real-world objects. Examples of displays used in an optical see-through AR system are AR glasses, an HMD, another AR headset, or other similar device that can include a lens or glass in front of each eye (or a single lens or glass over both eyes) to allow the user to see a real-world or physical object directly, while also allowing an enhanced image of that object or additional AR content to be projected onto the display to augment the user's visual perception of the real world.

VR provides a complete immersive experience in a three-dimensional computer-generated VR environment or video depicting a virtual version of a real-world environment. The VR environment can be interacted with in a seemingly real or physical way. As a user experiencing a VR environment moves in the real world, images rendered in the virtual environment also change, giving the user the perception that the user is moving within the VR environment. For example, a user can turn left or right, look up or down, and/or move forwards or backwards, thus changing the user's point of view of the VR environment. The VR content presented to the user can change accordingly, so that the user's experience is as seamless as in the real world. VR content can include VR video in some cases, which can be captured and rendered at very high quality, potentially providing a truly immersive virtual reality experience. Virtual reality applications can include gaming, training, education, sports video, online shopping, among others. VR content can be rendered and displayed using a VR system or device, such as a VR HMD or other VR headset, which fully covers a user's eyes during a VR experience.

MR technologies can combine aspects of VR and AR to provide an immersive experience for a user. For example, in an MR environment, real-world and computer-generated objects can interact (e.g., a real person can interact with a virtual person as if the virtual person were a real person).

In general, the generation of a high quality and user friendly user interface involves the design and appropriate application of features that communicate functionality and response options to a user. Such features can be referred to as affordances and are fundamental to how users interact with both the real and digital world. For example, in the real world, a door has a handle that suggests how it can be opened. In another example, in the digital world, underlined blue text communicates the availability of more information via a hyperlink and also the notion that the underlined blue text can be selected. Such affordances were not initially obvious, but was learned over time due in part to the simple nature of the features.

An XR system typically determines the type, layout, and controllability (based on different types of user input) of virtual content rendered on a user interface during an XR session, with no impact from physical objects in the real-world environment. As used herein, a user interface includes the display of any virtual content by an XR system, such as AR content, VR content, and/or MR content. For example, an XR system may generate and display a virtual copy of a physical object or a portion of the physical object (e.g., copying and pasting a portion of a physical object, such as a nutrition label, onto a surface, such as a table). In some cases, an XR system can configure, provide access to, and/or determine input types or functions for virtual content on a user interface based on the virtual content. For example, certain virtual content can be associated with supplemental information about a physical object in the real-world environment.

The present disclosure describes systems, apparatuses, processes (also referred to as methods), and computer-readable media (collectively referred to herein as "systems and techniques") for configuring user interfaces for XR systems (e.g., an HMD, AR glasses, etc.) and/or other systems (e.g., a heads-up display in a vehicle, etc.). In some cases, the systems and techniques provide the ability for an XR system to dynamically configure a user interface based on attributes of a physical object being augmented and/or attributes of a user interacting with the physical object.

For example, the systems and techniques can determine user interface layouts, input types, and/or input functions based on one or more attributes (e.g., physical attributes) of physical objects in a real-world environment (e.g., an object being augmented with virtual content by the XR system). In some cases, an XR system can determine a layout of virtual content and/or how the content will be controlled (based on one or more user inputs) based on the size, shape, orientation relative to the XR system (e.g., a camera and/or other sensor of the XR system), position relative to the XR system (e.g., a camera and/or other sensor of the XR system), an ability of the physical object to be held by a hand of a user (e.g., based on the size of the object and the size of the hand or hands of the user), and/or other attribute of a physical object for which the virtual content will be displayed.

In some examples, in addition to or as an alternative to the attributes of a physical object, the systems and techniques can determine the user interface layouts, input types, and/or input functions based on one or more attributes (e.g., physical attributes) of a user interacting with the physical object in the real-world environment. For instance, an XR system can determine a layout of virtual content and/or how the content will be controlled relative to a physical object based on a size of a body part (e.g., one or more hands, arms, legs, etc.), an orientation of the body part relative to the physical object, a position of the body part relative to the physical object, an orientation of the body part relative to the XR system (e.g., a camera and/or other sensor of the XR system), a position of the body part relative to the XR system (e.g., a camera and/or other sensor of the XR system), which hand of a user (right or left hand) is being used to hold the physical object, and/or other attribute.

The input types can be used to control or otherwise interact with the XR system. The input types can include categories of input, such as scrolling based inputs, tap-based inputs, gesture-based inputs, audio-based inputs, and/or other types or categories of inputs. For example, the XR system can determine that a scrolling input will be used for controlling virtual content displayed relative to a physical object based on attributes of the physical object and/or attributes of a user interacting with (e.g., holding) the physical object. The input functions can be determined for the input types, such as based on attributes of the physical object and/or attributes of a user interacting with the physical object. For instance, an input function can be defined for an input type to control how the input type will operate (e.g., an input function for a scrolling-based input type can be limited a particular scrolling direction, such as a vertical scrolling direction, horizontal scrolling direction, etc.).

In some examples, the systems and techniques described herein can generate virtual content in a way that allows a user to manipulate the virtual content. For example, an XR system can generate virtual content and can couple the virtual content to a first physical object (e.g., by anchoring the virtual content to one or more features of the first physical object). Based on received user input (e.g., a pinch gesture, a scroll-based input, etc.), the XR system can decouple the virtual content from the first physical object and can couple the virtual content to a second physical object. In another example, based on received user input (e.g., a pinch gesture, a scroll-based input, etc.), the XR system can detect a first physical object or portion of the first physical object and generate a virtual representation of the physical object or portion thereof. In some cases, based on the received user input, the XR system can decouple the virtual content from the first physical object and can couple the XR content to a second physical object.

In some examples, the systems and techniques can associate a marker on a physical object with virtual content. For instance, an XR system can interpret user input corresponding to selection of a marker on a physical object and can generate virtual content based on the user input. The marker can encode instructions to the XR system indicating how to retrieve additional content and how that content should be interacted with by a user (e.g., swiping horizontally to view more information). In some cases, the marker can include text, a symbol, a logo, a uniform resource locator (URL), a social network identifier (e.g., a Twitter™ handle or user name, etc.), any combination thereof, and/or other item. In one illustrative example, the XR system can detect user input corresponding to selection of a URL (as an example of a marker) printed on a label of a physical object. Based on the detected user input, the XR system can display virtual content (e.g., a web page, an application, etc.) with information related to the selected URL.

Further details regarding the systems and techniques are provided herein with respect to various figures. FIG. 1 is a diagram illustrating an example extended reality system 100, in accordance with some aspects of the disclosure. The extended reality system 100 can run (or execute) XR applications and implement XR operations. In some examples, the extended reality system 100 can perform tracking and localization, mapping of the physical world (e.g., a scene), and positioning and rendering of virtual content on a display 109 (e.g., a screen, visible plane/region, and/or other display) as part of an XR experience. For example, the extended reality system 100 can generate a map (e.g., a three-dimensional (3D) map) of a scene in the physical world, track a pose (e.g., location and position) of the extended reality system 100 relative to the scene (e.g., relative to the 3D map of the scene), position and/or anchor virtual content in a specific location(s) on the map of the scene, and render the virtual content on the display 109 such that the virtual content appears to be at a location in the scene corresponding to the specific location on the map of the scene where the virtual content is positioned and/or anchored. The display 109 can include a glass, a screen, a lens, a projector, and/or other display mechanism that allows a user to see the real-world environment and also allows XR content to be displayed thereon.

In this illustrative example, the extended reality system 100 includes one or more image sensors 102, an accelerometer 104, a gyroscope 106, storage 107, compute components 110, an XR engine 120, a interface layout and input management engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the extended reality system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the extended reality system 100 are further described below with respect to FIG. 11.

Moreover, for simplicity and explanation purposes, the one or more image sensors 102 will be referenced herein as an image sensor 102 (e.g., in singular form). However, one of ordinary skill in the art will recognize that the extended reality system 100 can include a single image sensor or multiple image sensors. Also, references to any of the components (e.g., 102-126) of the extended reality system 100 (or other systems described herein) in the singular or plural form should not be interpreted as limiting the number of such components implemented by the extended reality system 100 to one or more than one. For example, references to an accelerometer 104 in the singular form should not be interpreted as limiting the number of accelerometers implemented by the extended reality system 100 to one. One of ordinary skill in the art will recognize that, for any of the components 102-126 shown in FIG. 1, the extended reality system 100 can include only one of such component(s) or more than one of such component(s).

The extended reality system 100 includes or is in communication with (wired or wirelessly) an input device 108. The input device 108 can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 102 can capture images that can be processed for interpreting gesture commands.

The extended reality system 100 can be part of, or implemented by, a single computing device or multiple computing devices. In some examples, the extended reality system 100 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, and/or any other suitable electronic device(s).

In some implementations, the one or more image sensors 102, the accelerometer 104, the gyroscope 106, storage 107, compute components 110, XR engine 120, interface layout and input management engine 122, image processing engine 124, and rendering engine 126 can be part of the same computing device. For example, in some cases, the one or more image sensors 102, the accelerometer 104, the gyroscope 106, storage 107, compute components 110, XR engine 120, interface layout and input management engine 122, image processing engine 124, and rendering engine 126 can be integrated into an HMD, extended reality glasses, smartphone, laptop, tablet computer, gaming system, and/or any other computing device. However, in some implementations, the one or more image sensors 102, the accelerometer 104, the gyroscope 106, storage 107, compute components 110, XR engine 120, interface layout and input management engine 122, image processing engine 124, and rendering engine 126 can be part of two or more separate computing devices. For example, in some cases, some of the components 102-126 can be part of, or implemented by, one computing device and the remaining components can be part of, or implemented by, one or more other computing devices.

The storage 107 can be any storage device(s) for storing data. Moreover, the storage 107 can store data from any of the components of the extended reality system 100. For example, the storage 107 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the interface layout and input management engine 122, data from the image processing engine 124, and/or data from the rendering engine 126 (e.g., output frames). In some examples, the storage 107 can include a buffer for storing frames for processing by the compute components 110.

The one or more compute components 110 can include a central processing unit (CPU) 112, a graphics processing unit (GPU) 114, a digital signal processor (DSP) 116, an image signal processor (ISP) 118, and/or other processor (e.g., a neural processing unit (NPU) implementing one or more neural networks). The compute components 110 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), machine learning operations, filtering, and/or any of the various operations described herein. In some examples, the compute components 110 can implement (e.g., control, operate, etc.) the XR engine 120, the interface layout and input management engine 122, the image processing engine 124, and the rendering engine 126. In other examples, the compute components 110 can also implement one or more other processing engines.

The image sensor 102 can include any image and/or video sensors or capturing devices. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the interface layout and input management engine 122, the image processing engine 124, and/or the rendering engine 126 as described herein.

In some examples, the image sensor 102 can capture image data and can generate images (also referred to as frames) based on the image data and/or can provide the image data or frames to the XR engine 120, the interface layout and input management engine 122, the image processing engine 124, and/or the rendering engine 126 for processing. An image or frame can include a video frame of a video sequence or a still image. An image or frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 102 (and/or other camera of the extended reality system 100) can be configured to also capture depth information. For example, in some implementations, the image sensor 102 (and/or other camera) can include an RGB-depth (RGB-D) camera. In some cases, the extended reality system 100 can include one or more depth sensors (not shown) that are separate from the image sensor 102 (and/or other camera) and that can capture depth information. For instance, such a depth sensor can obtain depth information independently from the image sensor 102. In some examples, a depth sensor can be physically installed in the same general location as the image sensor 102, but may operate at a different frequency or frame rate from the image sensor 102. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The extended reality system 100 also includes one or more sensors. The one or more sensors can include one or more accelerometers (e.g., accelerometer 104), one or more gyroscopes (e.g., gyroscope 106), and/or other sensors. The one or more sensors can provide velocity, orientation, and/or other position-related information to the compute components 110. For example, the accelerometer 104 can detect acceleration by the extended reality system 100 and can generate acceleration measurements based on the detected acceleration. In some cases, the accelerometer 104 can provide one or more translational vectors (e.g., up/down, left/right, forward/back) that can be used for determining a position or pose of the extended reality system 100. The gyroscope 106 can detect and measure the orientation and angular velocity of the extended reality system 100. For example, the gyroscope 106 can be used to measure the pitch, roll, and yaw of the extended reality system 100. In some cases, the gyroscope 106 can provide one or more rotational vectors (e.g., pitch, yaw, roll). In some examples, the image sensor 102 and/or the XR engine 120 can use measurements obtained by the accelerometer 104 (e.g., one or more translational vectors) and/or the gyroscope 106 (e.g., one or more rotational vectors) to calculate the pose of the extended reality system 100. As previously noted, in other examples, the extended reality system 100 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the extended reality system 100, using a combination of one or more accelerometers, one or more gyroscopes, and/or one or more magnetometers. In some examples, the one or more sensors can output measured information associated with the capture of an image captured by the image sensor 102 (and/or other camera of the extended reality system 100) and/or depth information obtained using one or more depth sensors of the extended reality system 100.

The output of one or more sensors (e.g., the accelerometer 104, the gyroscope 106, one or more IMUs, and/or other sensors) can be used by the extended reality engine 120 to determine a pose of the extended reality system 100 (also referred to as the head pose) and/or the pose of the image sensor 102 (or other camera of the extended reality system 100). In some cases, the pose of the extended reality system 100 and the pose of the image sensor 102 (or other camera) can be the same. The pose of image sensor 102 refers to the position and orientation of the image sensor 102 relative to a frame of reference (e.g., with respect to the object 202). In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 102 to track a pose (e.g., a 6DOF pose) of the extended reality system 100. For example, the device tracker can fuse visual data (e.g., using a visual tracking solution) from the image data with inertial data from the measurements to determine a position and motion of the extended reality system 100 relative to the physical world (e.g., the scene) and a map of the physical world. As described below, in some examples, when tracking the pose of the extended reality system 100, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the extended reality system 100 within the scene and the 3D map of the scene, etc. The 3D map can provide a digital representation of a scene in the real/physical world. In some examples, the 3D map can anchor location-based objects and/or content to real-world coordinates and/or objects. The extended reality system 100 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or the extended reality system 100 as a whole can be determined and/or tracked by the compute components 110 using a visual tracking solution based on images captured by the image sensor 102 (and/or other camera of the extended reality system 100). For instance, in some examples, the compute components 110 can perform tracking using computer vision-based tracking, model-based tracking, and/or simultaneous localization and mapping (SLAM) techniques. For instance, the compute components 110 can perform SLAM or can be in communication (wired or wireless) with a SLAM engine (not shown). SLAM refers to a class of techniques where a map of an environment (e.g., a map of an environment being modeled by extended reality system 100) is created while simultaneously tracking the pose of a camera (e.g., image sensor 102) and/or the extended reality system 100 relative to that map. The map can be referred to as a SLAM map, and can be three-dimensional (3D). The SLAM techniques can be performed using color or grayscale image data captured by the image sensor 102 (and/or other camera of the extended reality system 100), and can be used to generate estimates of 6DOF pose measurements of the image sensor 102 and/or the extended reality system 100. Such a SLAM technique configured to perform 6DOF tracking can be referred to as 6DOF SLAM. In some cases, the output of the one or more sensors (e.g., the accelerometer 104, the gyroscope 106, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 102 (and/or other camera) to the SLAM map. For example, 6DOF SLAM can use feature point associations from an input image to determine the pose (position and orientation) of the image sensor 102 and/or extended reality system 100 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 102 and/or the extended reality system 100 can be determined by projecting features from the 3D SLAM map into an image or video frame and updating the camera pose from verified 2D-3D correspondences.

In one illustrative example, the compute components 110 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the extended reality system 100 can also track the hand and/or fingers of the user to allow the user to interact with and/or control virtual content in a virtual environment. For example, the extended reality system 100 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 2:
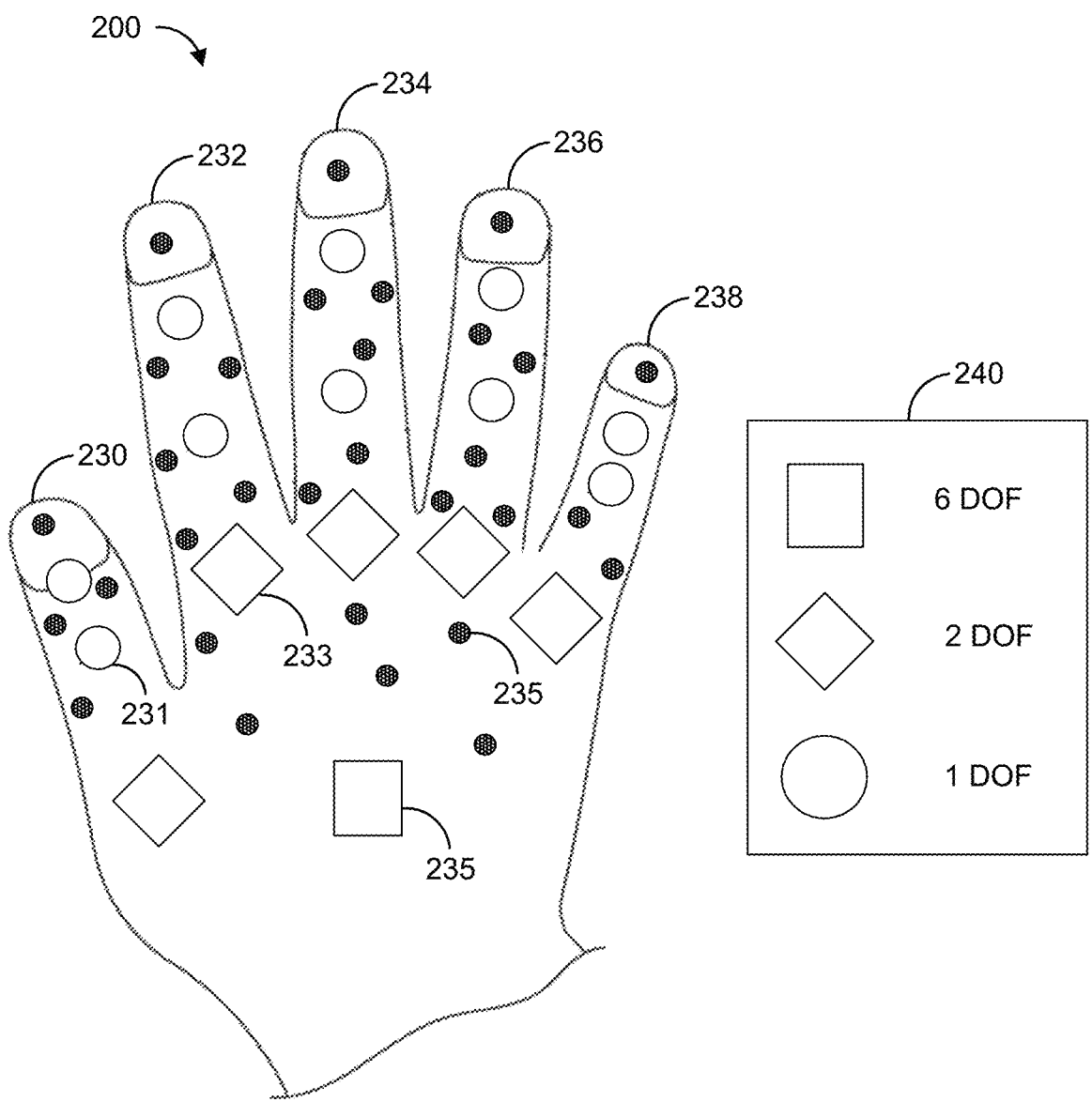
FIG. 2 is a diagram illustrating example landmark points of a hand that can be used to track positions of the hand and interactions by the hand with a virtual environment, in accordance with some examples of the present disclosure.

FIG. 2 is a diagram illustrating example landmark points of a hand 200 that can be used to track positions of the hand 200 and interactions by the hand 200 with a virtual or real-world environment, such as a physical object in the real-world environment, virtual content displayed by an extended reality system, etc. The landmark points shown in FIG. 2 correspond to different parts of the hand 200, including a landmark point 235 on the palm of the hand 200, landmark points on the thumb 230 of the hand 200, landmark points on the index finger 232 of the hand 200, landmark points on the middle finger 234 of the hand 200, landmark points on the ring finger 236 of the hand 200, and landmark points on the pinky finger 238 of the hand 200. The palm of the hand 200 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 2, as indicated in the legend 240.

The different joints of the fingers of the hand 200 allow for different degrees of movement, as illustrated in the legend 240. As illustrated by the diamond shapes (e.g., diamond 233) in FIG. 2, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 231) in FIG. 2, each of the upper joints of each finger (corresponding to the interphalangeal joints between the distal, middle, and proximal phalanges) has one degree of freedom (2DOF) corresponding flexion and extension. As a result, the hand 200 provides 26 degrees of freedom (26DOF) from which to track the hand 200 and interactions by the hand 200 with virtual content rendered by the extended reality system 100.

The extended reality system 100 can use one or more of the landmark points on the hand 200 to track the hand 200 (e.g., track a pose and/or movement of the hand 200) and track interactions of the hand 200 with virtual content (e.g., one or more items of virtual content) rendered by the extended reality system 100 and/or interactions with physical objects in the real-world environment. As noted above, as a result of the detection of the one or more landmark points on the hand 200, the pose of the landmarks (and thus the hand and fingers) in relative physical position with respect to the extended reality system 100 can be established. For example, the landmark points on the palms of the hand 200 (e.g., the landmark point 235) can be detected in an image, and the locations of the landmark points can be determined with respect to the image sensor 102 of the extended reality system 100. A point of an item of virtual content (e.g., a center point, such as a center of mass or other center point) rendered by the extended reality system 100 can be translated to a position on a display (or a rendering on the display) of the extended reality system 100 (e.g., the display 109 of FIG. 1) relative to the locations determined for the landmark points on the palms of the hand 200.

As described below, the extended reality system 100 can also register the virtual content and/or the hand 200 to points in the real-world environment (as detected in one or more images) and/or to other parts of the user. For instance, in some implementations, in addition to determining a physical pose of the hand 200 with respect to the extended reality system 100 (or extended reality system 100) and/or an item of virtual content, the extended reality system 100 can determine the location of other landmarks in the real-world environment, such as distinctive points (referred to as feature points) on walls, one or more corners of objects, features on a floor, points on a human face, points on nearby devices, among others. In some cases, the extended reality system 100 can place the virtual content within a certain position with respect to feature points detected in the environment, which can correspond to, for example, detected objects and/or humans in the environment.

In some examples, the pose of the extended reality system 100 (and/or the head of the user) can be determined using, for example, image data from the image sensor 102 and/or measurements from one or more sensors such as the accelerometer 104, the gyroscope 106, and/or one or more other sensors (e.g., one or more magnetometers, one or more inertial measurement units (IMUs), etc.). The head pose can be used to determine a position of the virtual content, the hand 200, and/or objects and/or humans in the environment.

The operations for the XR engine 120, the interface layout and input management engine 122, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the interface layout and input management engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations to generate an XR experience based on data from the image sensor 102, the accelerometer 104, the gyroscope 106, and/or one or more sensors on the extended reality system 100, such as one or more IMUs, radars, etc. In some examples, the XR engine 120 can perform tracking, localization, pose estimation, mapping, content anchoring operations, and/or any other XR operations or functionalities. An XR experience can include use of the extended reality system 100 to present XR content (e.g., virtual reality content, augmented reality content, mixed reality content, etc.) to a user during a virtual session. In some examples, the XR content and experience can be provided by the extended reality system 100 through an XR application (e.g., executed or implemented by the XR engine 120) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the extended reality system 100. In some cases, the user can view and/or interact with the virtual content while also being able to view and/or interact with the physical environment around the user, allowing the user to have an immersive experience between the physical environment and virtual content mixed or integrated with the physical environment.

The interface layout and input management engine 122 can perform various operations to determine (and manage) how, where, and/or when to render virtual content during an XR experience. As described herein, the interface layout and input management engine 122 can dynamically configure a user interface during an XR session based on attributes of one or more physical objects being augmented with virtual content and/or attributes of a user interacting with the one or more physical objects. For example, the interface layout and input management engine 122 can determine user interface layouts, input types, and/or input functions based on one or more attributes of physical objects in the real-world environment and/or based on one or more attributes of a user (e.g., one or more body parts of the user, such as the user's hands relative to a physical object) interacting with the physical object in the real-world environment. Further details regarding operations of the interface layout and input management engine 122 are described herein.

The image processing engine 124 can perform one or more image processing operations related to virtual content being presented during an XR session and/or related to other image content. For instance, the image processing engine 124 can perform image processing operations based on data from the image sensor 102. In some cases, the image processing engine 124 can perform image processing operations such as, for example, filtering, demosaicing, scaling, color correction, color conversion, segmentation, noise reduction filtering, spatial filtering, artifact correction, etc. The rendering engine 126 can obtain image data generated and/or processed by the compute components 110, the image sensor 102, the XR engine 120, the interface layout and input management engine 122, and/or the image processing engine 124, and can render video and/or image frames for presentation on a display device.

While the extended reality system 100 is shown to include certain components, one of ordinary skill will appreciate that the extended reality system 100 can include more or fewer components than those shown in FIG. 1. For example, the extended reality system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing system and hardware components that can be implemented with the extended reality system 100 is described below with respect to FIG. 9.

Figure 3:
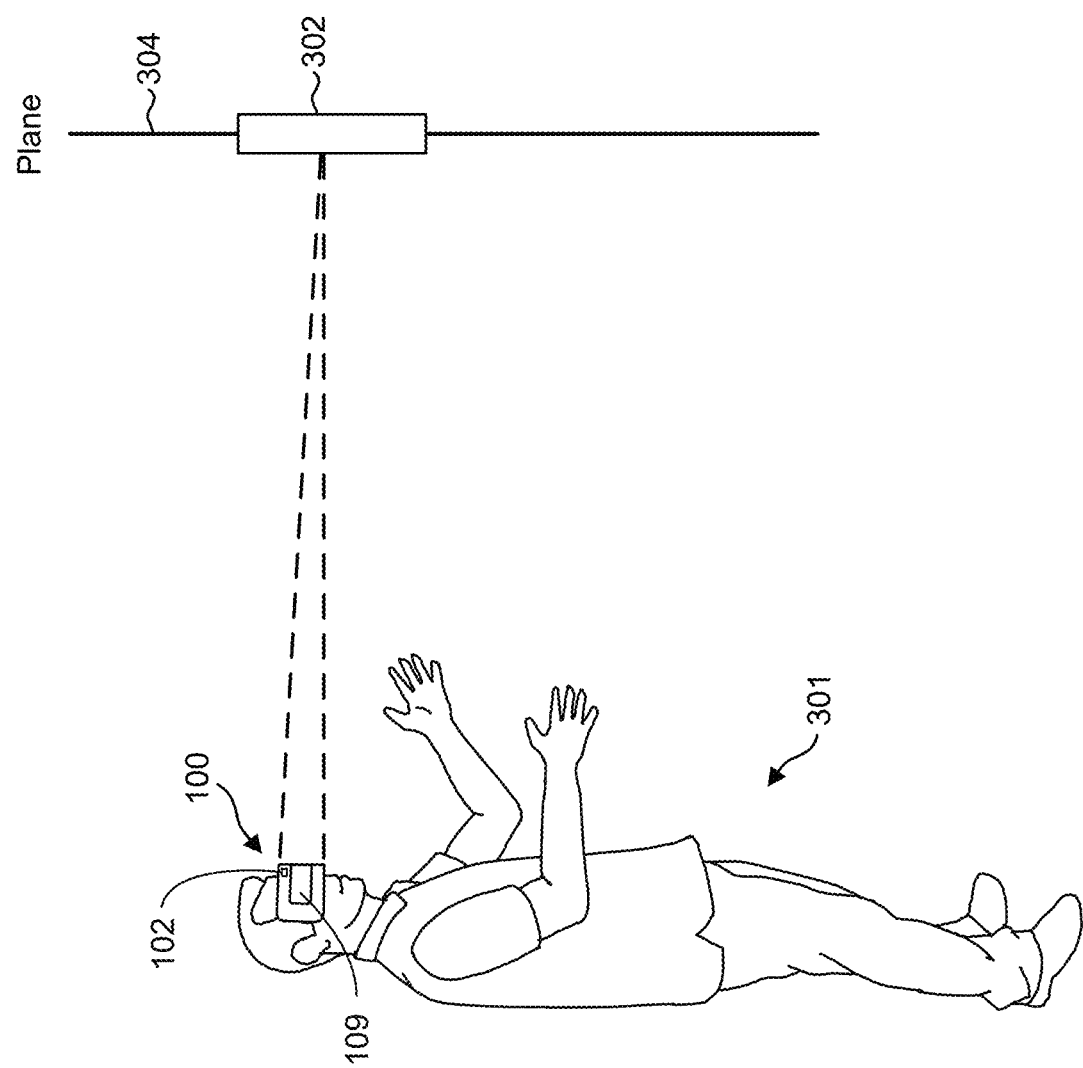
FIG. 3 is a diagram illustrating an example of an extended reality system being worn by a user, in accordance with some examples of the present disclosure.

FIG. 3 is a diagram illustrating an example of the extended reality system 100 being worn by a user 301. While the extended reality system 100 is shown in FIG. 3 as an AR device (e.g., AR glasses), the extended reality system 100 can include any suitable type of XR device, such as an HMD or other XR device. Examples described below will be described using AR for illustrative purposes. However, the aspects described below can be applied to other types of XR, such as VR and MR. The extended reality system 100 shown in FIG. 3 can include an optical see-through AR device, which allows the user 301 to view the real world while wearing the extended reality system 100. For example, the user 301 can view an object 302 in a real-world environment on a plane 304 at a distance from the user 301.

As shown in FIG. 3 and described above, the extended reality system 100 has an image sensor 102 and a display 109. As described above, the display 109 can include a glass (or multiple pieces of glass), one or more screens, one or more lenses, and/or one or more other display mechanisms that allow the user 301 to see the real-world environment and that allow AR content to be displayed thereon. AR content (e.g., an image, a video, a graphic, a virtual or AR object, or other AR content) can be projected or otherwise displayed on the display 109. In one example, the AR content can include an augmented version of the object 302. In another example, the AR content can include additional AR content that is related to the object 302 and/or related to one or more other objects in the real-world environment. While one image sensor 102 and one display 109 are shown in FIG. 3, the extended reality system 100 can include multiple cameras and/or multiple displays (e.g., a display for the right eye and a display for the left eye) in some implementations.

As described above with respect to FIG. 1, the interface layout and input management engine 122 can configure a user interface of an XR session by detecting or determining attributes of one or more physical objects in a real-world environment being augmented and/or attributes of a user interacting with the one or more physical objects. For example, interface layout and input management engine 122 can determine user interface layouts, input types, and/or input functions based on the one or more attributes of physical objects and/or the user. The attributes of a physical object can include the size of the object, the shape of the object, the orientation of the object relative to the interface layout and input management engine 122 (e.g., the image sensor 102 and/or other sensor of engine 122), the position of the object relative to the interface layout and input management engine 122, an ability of the physical object to be held by a hand of a user (e.g., based on the size of the object and the size of the hand or hands of the user), any combination thereof, and/or other attribute of a physical object for which the virtual content will be displayed. The one or more attributes of the user can include a size of a body part of the user (e.g., one or more hands, arms, legs, etc.), an orientation of the body part relative to the physical object, a position of the body part relative to the physical object, an orientation of the body part relative to the interface layout and input management engine 122, a position of the body part relative to the interface layout and input management engine 122, whether the user is holding the object with the right hand, the left hand, or both hands, and/or other attribute.

As previously noted, the interface layout and input management engine 122 can use the attributes of the physical object and/or the user to determine the interface layouts of the user interface. For example, the interface layout and input management engine 122 can determine the placement or can change the placement of virtual content (e.g., AR content) relative to a physical object based on how a user is holding the physical object (e.g., whether the user is holding the object with a left hand or a right hand). For instance, if the user is holding the physical object with their right hand, the virtual content can be displayed relative to the left side of the physical object (thus avoiding the user's hand from blocking, occluding, or otherwise interfering with display of the virtual content). In another example, the interface layout and input management engine 122 can determine the layout of virtual content displayed relative to a physical object based on the shape, size, and/or other attribute of the physical object. For instance, the virtual content can be displayed with a size that is relative to the size, shape, etc. of the physical object (e.g., with a same height and/or width as the physical object, with a same height and/or width of a portion of the physical object such as the physical label 412 shown in FIG. 4). In another example, the interface layout and input management engine 122 can determine the layout of virtual content displayed relative to a physical object based on the shape, size, and/or other attribute of the physical object and based on how the object is held by a user (indicating how easily the user can interact with the virtual content given the way the user is holding the object).

In some examples, the interface layout and input management engine 122 can use the attributes of the physical object and/or the user to determine an input type used to control or manipulate virtual content displayed relative to a physical object and/or to determine one or more input functions for the input type. In one illustrative example, the interface layout and input management engine 122 can define or change an orientation of a scroll-based input type (e.g., horizontal or vertical scroll) based on the layout of the content, based on the physical attributes of the physical object, and/or based on the attributes of the user. In another example, the interface layout and input management engine 122 can define an input type as a tap-based input type (e.g., allowing a user to traverse through content using taps on the physical object rather) based on the position of virtual content relative to the physical object, based on the size and/or shape (among other attributes) of the object, and based on how the attributes allow or discourage certain input methods.

The input types can include categories of input (e.g., scrolling based inputs, tap-based inputs, gesture-based inputs, audio-based inputs, and/or other types or categories of inputs). In one illustrative example, the interface layout and input management engine 122 can determine that a scrolling input will be used for controlling virtual content displayed relative to a physical object based on attributes of the physical object and/or attributes of a user interacting with (e.g., holding) the physical object.

A scrolling-based input can include vertical scrolling (e.g., scrolling in an up and/or down direction), horizontal scrolling (e.g., scrolling in a left and/or right direction), horizontal scrolling, and/or scrolling in other direction(s). A tap-based input can include tapping a virtual object or portion of a virtual object to perform a selection. A gesture-based input can include a gesture, such as a pinch gesture to zoom in and/or out, a scroll gesture, a hand gesture, and/or other gesture detected by a camera or other sensor of the interface layout and input management engine 122. An audio-based input (or voice input) can include an audible command (provided by a user) detected and used by the interface layout and input management engine 122 to control virtual content. Other types of input can also be used by an interface layout and input management engine 122 to control virtual content.

The input functions can be determined for the input types. Using a scrolling-based input type as an illustrative example, the interface layout and input management engine 122 can determine that the input function for the scrolling-based input type will be limited to one or more scrolling directions. For instance, the interface layout and input management engine 122 can determine that a scrolling input for controlling virtual content displayed relative to a physical object will be in a vertical direction (e.g., allowing vertical scrolling in an up and down direction) based on attributes of the physical object and/or attributes of a user interacting with (e.g., holding) the physical object.

Figure 4:
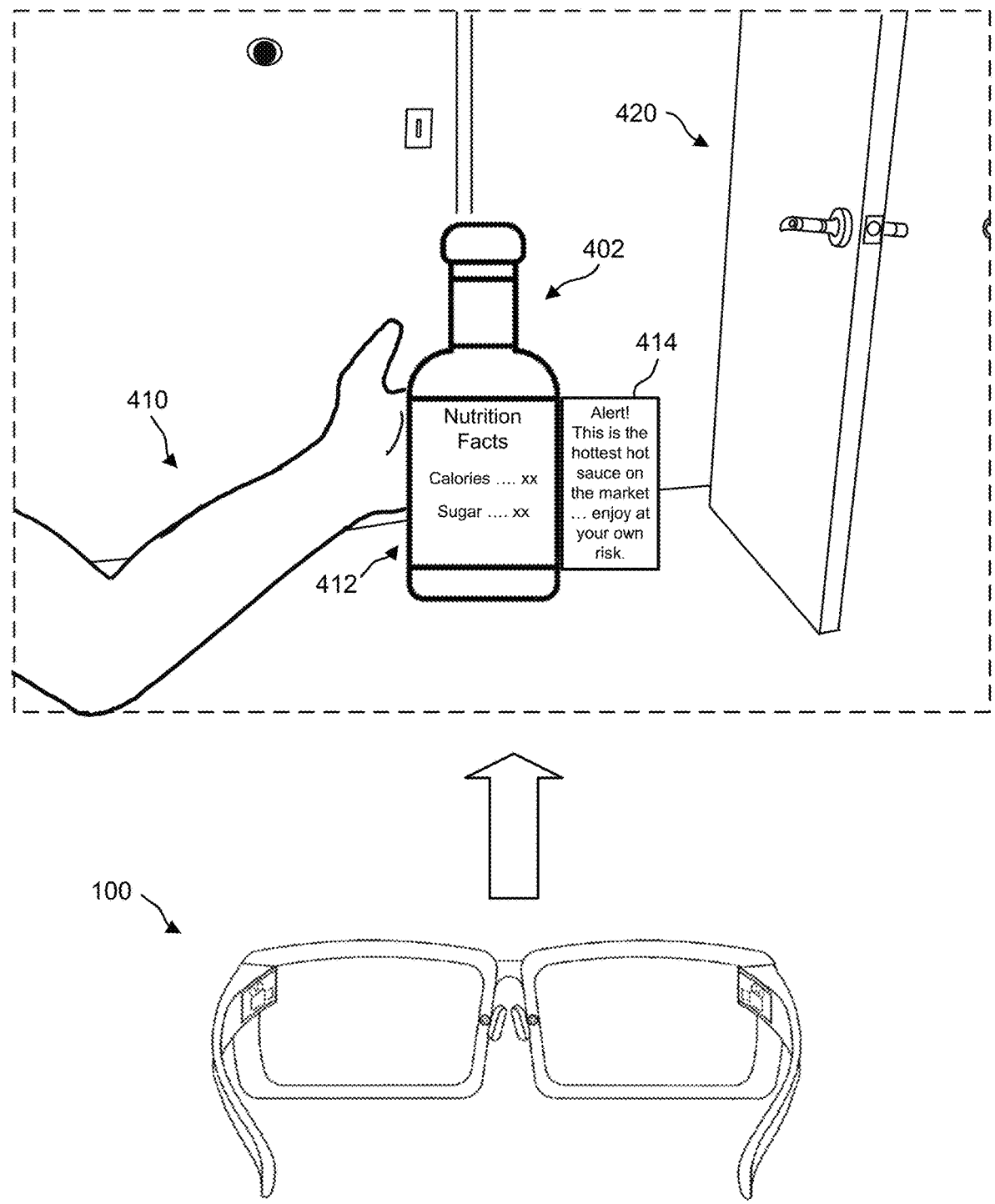
FIG. 4 is a diagram illustrating an example of virtual content being displayed relative to a real-world or physical object based on attributes of the object and/or attributes of a user, in accordance with some examples of the present disclosure.

FIG. 4 is a diagram illustrating an example of a view of an augmented reality (AR) virtual session. As shown, the extended reality system 100 displays virtual content 414 relative to a physical object 402 in a real-world environment. The physical object 402 has a physical label 412 with information related to the physical object 402. The virtual content 414 can include information that supplements (e.g., additional information) the information on the label 412. As shown in FIG. 4, a user wearing the extended reality system 100 is holding the physical object 402 with a left hand 410. The interface layout and input management engine 122 can determine the user is holding the physical object 402 with the left hand 410. In some cases, the interface layout and input management engine 122 can determine attributes of the physical object 402, such as the size of the object 402, the shape of the object 402, the position and/or orientation of the object 402 relative to the left hand 410 of the user, and/or other attributes. In some cases, the interface layout and input management engine 122 can determine other attributes of the user, such as the size of the user's left hand 410 (e.g., the size of the hand relative to the physical object 402), how the user is holding the physical object 402 with the left hand 410, and/or other attributes.

In some cases, the interface layout and input management engine 122 can cause the virtual content 414 to be displayed based on a physical attribute of the physical object 402. For instance, as shown in FIG. 4, the interface layout and input management engine 122 can cause the extended reality system 100 to display the virtual content 414 with a same height as the label 412 and next to the label 412, which can indicate to a user wearing the extended reality system 100 that the virtual content 414 information supplements the information on the label 412. Alternatively or additionally, the interface layout and input management engine 122 can determine a position for the virtual content 414 relative to a right side of the physical object 402 in response to determining the user is holding the physical object 402 with the user's left hand 410. The extended reality system 100 can then display the virtual content 414 relative to the right side of the physical object 402. The virtual content 414 thus extends outward in the opposite direction from the hand 410, allowing the virtual content 414 to be easily viewable by the user without any occlusion by the object 402, the user, and/or other physical object in the real-world environment.

As noted above, in some examples, the interface layout and input management engine 122 can determine a size of the virtual content 414 for display based on the size of the physical object 402 or a portion (e.g., the label 412) of the physical object 402. For instance, the interface layout and input management engine 122 can determine a height of the virtual content 414 to be equal or substantially equal (e.g., within a certain length, such as 1 centimeter, 2 centimeters, etc.) to the height of the label 412. In another example, the interface layout and input management engine 122 can determine a width of the virtual content 414 so that the virtual content 414 is not overlapping with the door 420 in the real-world environment (thus avoiding occlusion or overlapping of the virtual content 414 by/with the door 420).

FIG. 5 is a diagram illustrating another example of a view of an AR virtual session. Similar to the view from FIG. 4, the extended reality system 100 displays virtual content 514 relative to a physical object 502 in a real-world environment. A physical label 512 on the physical object 502 includes information related to the physical object 402. The virtual content 514 can include information supplementing (e.g., additional information) the information on the label 512. As illustrated in FIG. 5, the user of the extended reality system 100 is holding the physical object 402 with a right hand 511. The interface layout and input management engine 122 can determine the user is holding the physical object 502 with the right hand 511, and can also determine other attributes of the user and/or the object 502. For example, the interface layout and input management engine 122 can determine the size of the physical object 502, the shape of the object 502, the position and/or orientation of the object 502 relative to the right hand 511 of the user, and/or other attributes. In some cases, the interface layout and input management engine 122 can determine the size of the user's right hand 511 (e.g., the size of the hand relative to the object 502), how the user is holding the physical object 502 with the right hand 511, and/or other attributes.

In response to determining the user is holding the physical object 502 with the user's right hand 511, the interface layout and input management engine 122 can determine a position for the virtual content 414 relative to a left side of the physical object 502. As depicted in FIG. 5, the extended reality system 100 can then display the virtual content 514 relative to the left side of the physical object 502. Similar to the example in FIG. 4, the virtual content 514 extends outward in the opposite direction from the right hand 511, allowing the virtual content 514 to be easily viewable by the user without any occlusion by physical objects in the real-world environment. In some examples, the interface layout and input management engine 122 can determine a size of the virtual content 514 for display based on the size of the physical object 402, a size of a portion (e.g., the label 512) of the physical object 402, and/or a location, position, and/or size of other objects in the real-world environment.

In some examples, the interface layout and input management engine 122 can change the placement of virtual content in response to determining the user has changed how they are holding the physical object. For example, referring to FIG. 4, the user of the extended reality system 100 may switch from holding the physical object 402 with the left hand 410 to holding the physical object 402 with a right hand (e.g., as shown in FIG. 5). In response to determining the user is holding the holding the physical object 402 with the right hand (after previously holding the object 402 with the left hand 410), the interface layout and input management engine 122 can change the placement of the virtual content 414 from the position on the right side of the physical object 402 to a position on the left side of the physical object 402 (e.g., similar to that shown in FIG. 5). In some cases, the virtual content 414 can be displayed in other positions relative to the physical object 402, such as above and/or below the physical object.

Figure 6A:
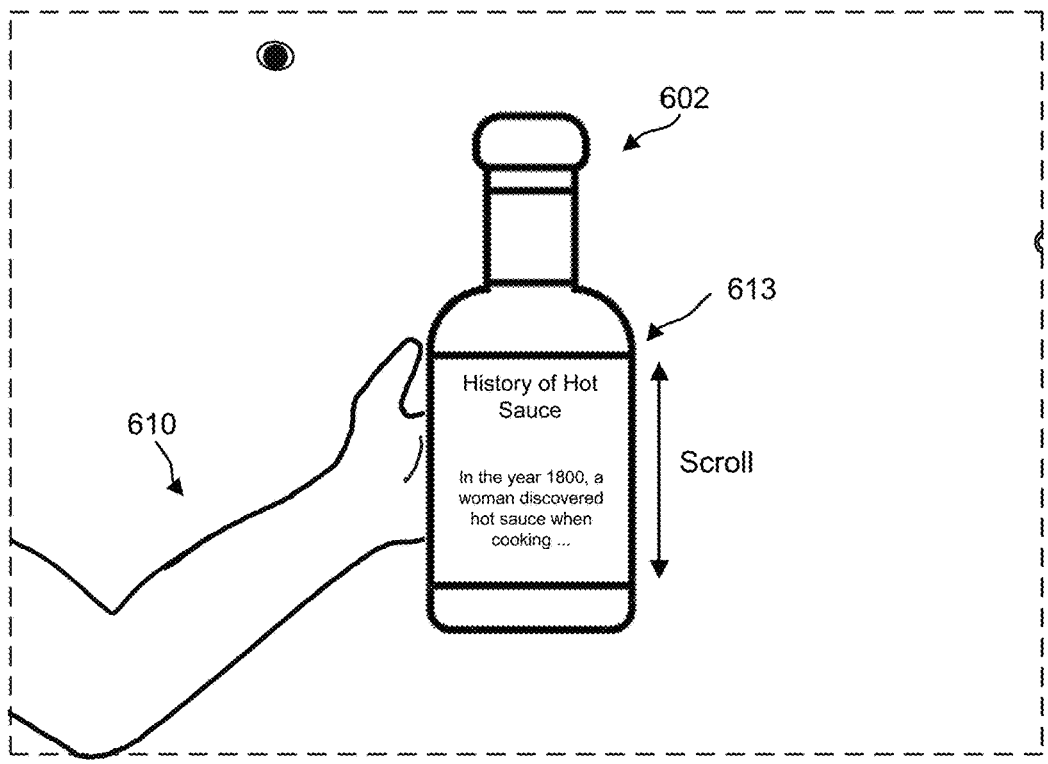
FIG. 6A, FIG. 6B, and FIG. 6C are diagrams illustrating examples of an input type and/or function associated with virtual content being determined based on attributes of an object and/or attributes of a user, in accordance with some examples of the present disclosure.
Figure 6B:
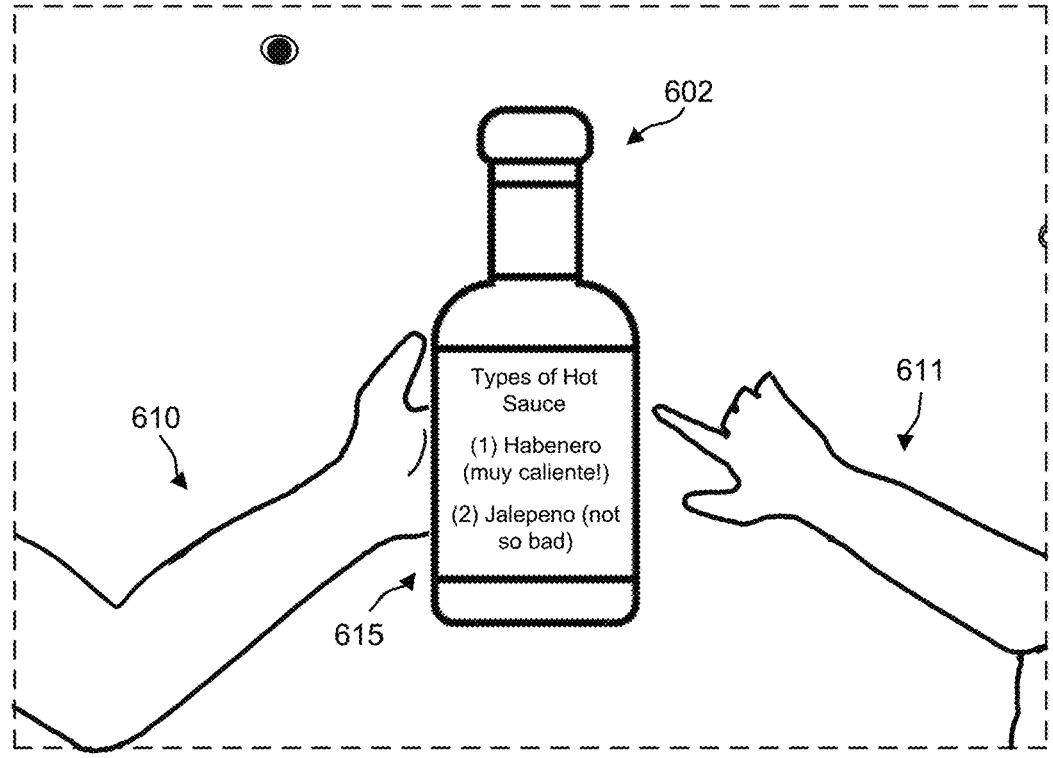
Figure 6C:
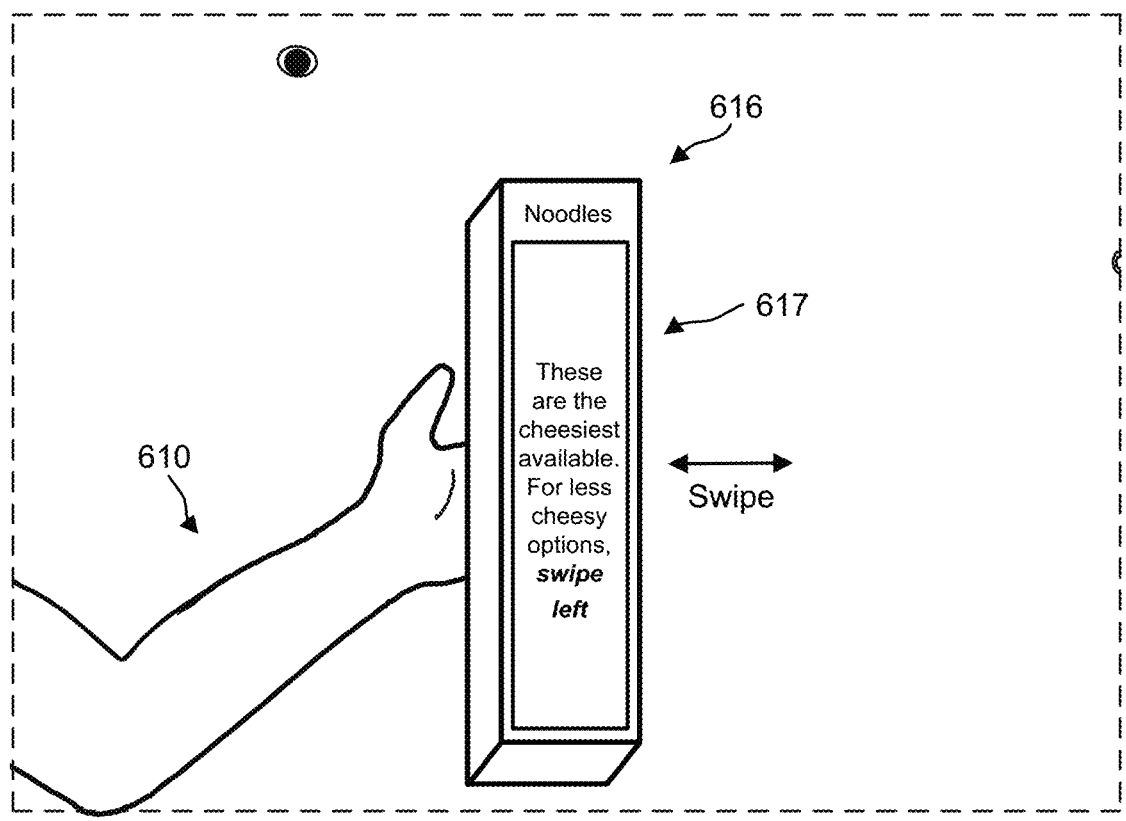

FIG. 6A, FIG. 6B, and FIG. 6C are diagrams illustrating another example of a view of an AR virtual session. According to the examples of FIG. 6A, FIG. 6B, and FIG. 6C, the interface layout and input management engine 122 can determine an input type and/or an input function for the input type based on attributes of a physical object and/or attributes of a user.

FIG. 6A illustrates an example of defining (or changing) a scrolling input type to a vertical scroll input function, such as based on a layout of virtual content, based on attribute(s) of the user, and/or based on attribute(s) of a physical object. For example, as shown in FIG. 6A, a user is holding a physical object 602 with the user's left hand 610. Virtual content 613 is displayed on a display of the extended reality system 100 over a position on the physical object 602 where a physical label is printed (e.g., blocking the physical label). In some examples, the virtual content 613 includes supplemental information related to the physical object 602. For instance, the object 602 can include a bottle of hot sauce, and the virtual content 613 (e.g., a virtual label) can include a history of hot sauce.

The interface layout and input management engine 122 can determine that the user is holding the physical object 602 with the left hand 610. In some cases, the interface layout and input management engine 122 can also determine the position and/or orientation of the left hand 610 with respect to the physical object 602. For instance, the interface layout and input management engine 122 can determine that the user is holding the object 602 with the four fingers of the hand 610 behind the object 602 and the thumb in front of the object 602. In response to determining that the user is holding the physical object 602 with the left hand 610 and/or that the four fingers of the hand 610 are behind the object 602 and the thumb is in front of the object 602, the interface layout and input management engine 122 can set or otherwise determine the input type for controlling and/or manipulating the virtual content 613 as a scroll input. The interface layout and input management engine 122 can also set or determine the input function for the scroll input as a vertical scrolling function (e.g., allowing a user to scroll up and down, as shown by the arrow in FIG. 6A). The user can provide a scroll-based input using the thumb or other finger or input device to control the virtual content 613. Based on the way in which the user is holding the object 602, the user's thumb can easily be used to vertically scroll (in an up and down direction) through the information displayed by the virtual content 613. In some examples, the interface layout and input management engine 122 can set or determine the input function for the virtual content 613 to be multiple input functions, such as a scroll-based input and a touch-based input (e.g., so the user can scroll through the virtual content and select certain content using a tap-based gesture, such as using the user's thumb), a scroll-based input and a wrist-based input (described below), and/or other combination of input types.

In some examples, the virtual content 613 can be displayed in a position next to the physical object 602 (e.g., on a right side of the physical object 602, such as in the position at which the virtual content 414 is displayed in FIG. 4). In such an example, the interface layout and input management engine 122 can associate the scroll-based input with the vertical scrolling function with the physical object 602. Using the scroll-based input and vertical scrolling function, the user can scroll through the virtual content displayed next to the physical object 602 by performing a scrolling gesture on the physical object 602.

In some examples, in addition to or as an alternative to the scroll-based input and/or touch-based input, the interface layout and input management engine 122 can set or otherwise determine the input type for controlling and/or manipulating the virtual content 613 as a wrist-based input in response to determining that the user is holding the physical object 602 with the left hand 610 and/or that the four fingers of the hand 610 are behind the object 602 and the thumb is in front of the object 602. The interface layout and input management engine 122 can also set or determine the input function for the wrist-based input as a two-dimensional input function. For instance, the two-dimensional input function for the wrist-based input can include a scroll-forward function in response to the user twisting a wrist of the left hand 610 in a first direction (e.g., in a forward direction such that the top of the physical object 602 is tipped forward away from the user) and a scroll-backwards function in response to the user twisting a wrist of the left hand 610 in a second direction (e.g., in a backwards direction such that the top of the physical object 602 is tipped backward toward the user). In one illustrative example, the user can provide the wrist-based input by twisting the wrist forward to scroll forward through one or more pages of virtual content displayed on the physical object 602 or backwards to scroll backwards through the one or more pages of virtual content displayed on the physical object 602.

FIG. 6B illustrates an example of defining (or changing) an input type and/or an input function based on attributes of a physical object 602 and/or a user. For instance, the interface layout and input management engine 122 can change and/or add an input type and/or can change and/or add the input function of an input type (e.g., change a scrolling orientation of a scroll-based input from vertical to horizontal) based on a layout of virtual content, based on attribute(s) of the user, and/or based on attribute(s) of a physical object. Referring to FIG. 6B, a user is holding the physical object 602 with the user's left hand 610, similar to that in FIG. 6A. In FIG. 6B, the user also has the left hand 611 in a field of view (FOV) of the extended reality system 100 (e.g., in a FOV of one or more cameras of the extended reality system 100). An index finger of the left hand 611 is positioned near virtual content 615 being displayed on the physical object 602. As noted above, in some cases, the virtual content 615 can be displayed next to the physical object 602 (e.g., below, to the right of, above, other otherwise relative to the physical object 602). In the illustrative example of FIG. 6B, the object 602 includes a bottle of hot sauce, and the virtual content 613 (e.g., a virtual label) includes information regarding types of hot sauce.

The interface layout and input management engine 122 can determine that the user is holding the physical object 602 with the left hand 610 and that the user's right hand 611 is in view of the extended reality system 100 (e.g., as detected by the image sensor 102 and/or other sensor of the extended reality system 100). In some cases, the interface layout and input management engine 122 can determine that the index finger is in a position relative to the virtual content 615 (e.g., within a threshold distance of the virtual content 615, such as within 1 inch, 2 inches, and/or other distance). In response to determining that the user is holding the physical object 602 with the left hand 610 and that the right hand 611 is in view of the extended reality system 100 (and in some cases that the index finger is positioned relative to the virtual content 615), the interface layout and input management engine 122 can set or determine the input function of a scrolling input type to a horizontal scrolling direction (allowing the user to scroll from left-to-right and/or from right-to-left). The user can provide a scroll-based input using the index finger of the right hand 611, using another finger, or using an input device to control the virtual content 615.

In another example, the interface layout and input management engine 122 can define or change the input type (e.g., define or change an input type as a tap function) based on a layout of virtual content, based on attribute(s) of the user, and/or based on attribute(s) of a physical object. For example, the interface layout and input management engine 122 can set the input type as a tap or touch-based input to allow a user to traverse through content via taps or touches on the physical object. Again referring to FIG. 6B, the interface layout and input management engine 122 can determine that the user is holding the physical object 602 with the left hand 610, that the user's right hand 611 is in view of the extended reality system 100, and in some cases that that the index finger of the right hand 611 is in a position relative to the virtual content 615 (e.g., within the threshold distance of the virtual content 615).

In response to determining that the user is holding the physical object 602 with the left hand 610 and that the right hand 611 is in view of the extended reality system 100 (and in some cases that the index finger is positioned relative to the virtual content 615), the interface layout and input management engine 122 can set or determine the input type as a tap-based input type, allowing a user to tap the physical object 602 to interact with the virtual content 615. In some cases, the interface layout and input management engine 122 can set the input type as a tap-based input type and a scroll-based input, allowing the user to interact with the virtual content 615 using scroll input and/or tap input.

FIG. 6C illustrates an example of defining (or changing) an input function of an input type based on attributes of a physical object 616 and/or a user. As shown in FIG. 6C, the user is holding the physical object 602 with the user's left hand 610. Virtual content 617 is displayed on a display of the extended reality system 100 over the physical object 616. In some examples, the virtual content 617 can be displayed next to the physical object 616 (e.g., to the right of, below, above, other otherwise relative to the physical object 616). In the illustrative example of FIG. 6C, the object 616 includes a box of noodles, and the virtual content 617 (e.g., a virtual label) includes information related to the box of noodles.

The physical object 616 (a box) in FIG. 6C has a different affordance as compared to the physical object 602 (a bottle) shown in FIG. 6A and FIG. 6B. The bottle shape of the physical object 602 is wider than the box shape of the physical object 616. With the box shape of the physical object 616 and based on how the user is holding the physical object 616, the user can easily swipe horizontally (forward and backward) across the surface of the physical object 616, whereas a vertical scroll is more appropriate for the physical object 602.

The interface layout and input management engine 122 can determine that the user is holding the physical object 616 with the left hand 610. In some cases, the interface layout and input management engine 122 can also determine the position and/or orientation of the left hand 610 with respect to the physical object 616. For instance, the interface layout and input management engine 122 can determine that the user is holding the object 616 with the four fingers of the hand 610 behind the object 616 and the thumb in front of the object 616. In response to determining that the user is holding the physical object 616 with the left hand 610 and/or that the four fingers of the hand 610 are behind the object 616 and the thumb is in front of the object 616, the interface layout and input management engine 122 can set or otherwise determine the input type for controlling and/or manipulating the virtual content 613 as a scroll input. The interface layout and input management engine 122 can also set or determine the input function for the scroll input as a horizontal scrolling function (e.g., allowing a user to scroll left and right, as shown by the arrow in FIG. 6C). As shown, the virtual content 617 includes text alerting the user that a left swipe input can be used to access virtual content related to other noodle options. The user can provide a scroll-based input using the thumb or other finger or input device to control the virtual content 617.

Figure 7:
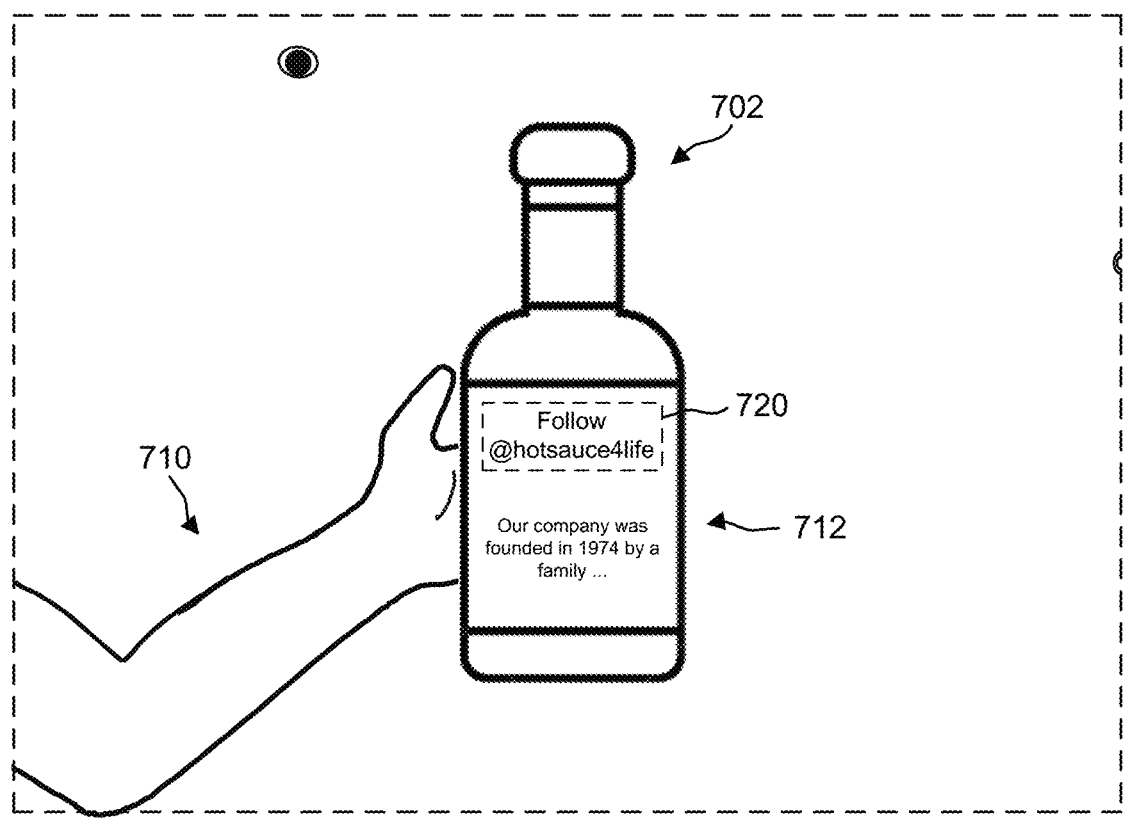
FIG. 7 is a diagram illustrating an example of a portion of a physical object that is selectable to generate virtual content, in accordance with some examples of the present disclosure.

FIG. 7 is a diagram illustrating an example of associating a marker 720 on a physical object 702 with virtual content. The marker 720 includes a social network identifier (e.g., a Twitter™ handle or user name). The marker 720 is physically printed on a label 712 of the physical object 702, which is held by a left hand 710 of the user. The interface layout and input management engine 122 can detect or identify the marker 720 in an image of the physical object 702.

In some cases, in response to detecting or identifying the marker 720, the interface layout and input management engine 122 can generate a virtual version of the marker 720 and can display the virtual version of the marker 720 on the display of the extended reality system 100 relative to the physical object (e.g., over the physical marker 720). The user can provide an input (e.g., a touch input, a gesture input, etc.) to select the virtual version of the marker 720. In response to receiving the input, the interface layout and input management engine 122 can generate virtual content related to the marker 720. For example, the interface layout and input management engine 122 can launch a web browser or application to display information related to the social network identifier @hotsauce4life.

In some examples, the rendering of the virtual version of the marker 720 can be head locked (e.g., in which case the virtual content moves as the user moves the extended reality system 100) or can be connected to the object (e.g., in which case the virtual content moves with the device). In some examples, the user can provide input to the extended reality system 100 that causes the interface layout and input management engine 122 to drag the virtual version of the marker 720 to a different location, such as a table nearby the physical object 702.

In some examples, the interface layout and input management engine 122 can detect a user input relative to the physical marker 720 (e.g., a user tapping on the physical marker 720). In such examples, the interface layout and input management engine 122 may not generate and display a virtual version of the marker 720. In response to receiving the input, the interface layout and input management engine 122 can generate virtual content related to the marker 720 (e.g., by launching a web browser or application to display information related to the social network identifier @hotsauce4life).

FIG. 8 is a diagram illustrating an example of generating virtual content that can be manipulated by a user. For example, in some cases as noted above, the extended reality system 100 can decouple virtual content from one physical object and can couple the virtual content to another physical object based on user input. In some cases, by providing a certain input (e.g., a pinch-to-zoom gesture by spreading the index finger and thumb apart), the user can cause the extended reality system 100 to expand the size of the virtual content, click on links in the virtual content, etc. As shown in FIG. 8, a user can view a physical object 802 in a real-world environment through a display of the extended reality system 100. A label 812 is shown on the physical object 802. The label 812 can include information related to the physical object 802. In some examples, the label 812 is a physical label attached to the physical object 802. In some examples, the label 812 is a virtual label displayed by the extended reality system 100 over the physical object 802.

As shown in FIG. 8, a user wearing the extended reality system 100 is holding the physical object 802 with a right hand 811. The user is also performing a pinch gesture input (by bringing the index finger and thumb toward one another) with the left hand 810 in order to select and drag the label 812 content (e.g., a virtual version of the physical label when the label 812 is a physical label, or the virtual label when the label 812 is a virtual label) onto a surface of a table 825 for better viewing and content manipulation.

The interface layout and input management engine 122 can determine or recognize the user is performing the pinch gesture input with the left hand 810. In some examples, gesture recognition (e.g., using the image sensor 102 and/or other sensor of the extended reality system) can be used to recognize the gesture. In some examples when the label 812 is a physical label, the interface layout and input management engine 122 can generate a virtual version of the label 812 in response to determining or recognizing the pinch gesture. As the user moves the gesture (as shown by the transition from the left side of FIG. 8 to the right side of FIG. 8), the interface layout and input management engine 122 can move the virtual version of the label 812 from the physical object 802 to the surface of the table 825. In some examples when the label 812 is a virtual label, in response to determining or recognizing the pinch gesture and as the user moves the gesture, the interface layout and input management engine 122 can move the virtual label 812 from the physical object 802 to the surface of the table 825. The interface layout and input management engine 122 can generate the virtual content so that the content is editable and/or selectable by the user. For example, the user can provide input to re-size the virtual label or the virtual version of the physical label (as indicated by the four arrows adjacent to each corner of the virtual label), select links of the virtual label, and/or otherwise further manipulate the virtual content of the virtual label.

FIG. 9 is a flowchart illustrating an example of a process 900 for generating virtual content using techniques described herein. At block 902, the process 900 includes obtaining (by a device) an image of a physical object in a real-world environment. In some cases, the real-world environment is viewable through a display of the device as the virtual content is displayed by the display.

At block 904, the process 900 includes determining at least one attribute of the physical object in the image. In some examples, the process 900 includes determining the at least one attribute of the physical object in a plurality of images (e.g., in multiple frames of a video or other sequence of images or frames). In some examples, the at least one attribute of the physical object includes a size of the physical object, a shape of the physical object, an orientation of the physical object with respect to the device, a position of the physical object with respect to the device, an ability of the physical object to be held by a hand of a user, any combination thereof, and/or other attribute.

At block 906, the process 900 includes determining an interface layout for virtual content based on the at least one attribute of the physical object. In some cases, the process 900 can include determining a body part of a user in one or more images, determining at least one attribute of the body part of the user in the one or more images, and determining the interface layout for the virtual content based on the at least one attribute of the physical object and the at least one attribute of the body part of the user. In some examples, the at least one attribute of the body part includes a size of the body part, an orientation of the body part relative to the physical object, a position of the body part relative to the physical object a position of the body part relative to the physical object, an orientation of the body part relative to the device, a position of the body part relative to the device, any combination thereof, and/or other attribute. In some examples, the body part of the user is a hand of the user. In such examples, the at least one attribute of the body part includes a size of the hand, an orientation of the hand relative to the physical object, a position of the hand relative to the physical object, an orientation of the hand relative to the device, a position of the hand relative to the device, whether the hand is a left hand or a right hand of the user, any combination thereof, and/or other attribute.

At block 908, the process 900 includes displaying the virtual content based on the determined interface layout. As described above, the virtual content can be projected or otherwise displayed on the display of the device.

In some examples, the process 900 includes determining a hand a user in one or more images, determining whether the hand is a left hand or a right hand of the user, and determining a position for the virtual content in the interface layout based on whether the hand is the left hand or the right hand of the user. In one illustrative example, the process 900 includes determining the hand is the left hand of the user. In such an example, the process 900 includes determining, based on the hand being the left hand of the user, the position for the virtual content relative to a right side of the physical object, and displaying the virtual content in the interface layout relative to the right side of the physical object. In another illustrative example, the process 900 includes determining the hand is the right hand of the user. In such an example, the process 900 includes determining, based on the hand being the right hand of the user, the position for the virtual content relative to a left side of the physical object, and displaying the virtual content in the interface layout relative to the left side of the physical object.

In some examples, the process 900 can include determining an input type based on the at least one attribute of the physical object, receiving input corresponding to the input type, and controlling the displayed virtual content based on the input type. In some cases, the input type includes a scrolling input. In some cases, the input type includes a tap input. The input type can include other types of input, such as a wrist-based input (e.g., a user turning their wrist forward or backwards, etc.), a swipe-based input (e.g., a user providing a gesture swiping to the left, right, up, down, diagonally, etc.), and/or other input. In some examples, the process 900 can include determining an input function for the input type based on the at least one attribute of the physical object, and controlling the displayed virtual content based on the determined input function for the input type.

FIG. 10 is a flowchart illustrating an example of a process 1000 for generating virtual content using techniques described herein. At block 1002, the process 1000 includes obtaining (by a device) an image of a physical object in a real-world environment. In some examples, the real-world environment is viewable through a display of the device as the virtual content is displayed by the display.

At block 1004, the process 1000 includes determining at least one attribute of the physical object in the image. In some examples, the process 1000 includes determining the at least one attribute of the physical object in a plurality of images e.g., in multiple frames of a video or other sequence of images or frames). In some cases, the at least one attribute of the physical object includes a size of the physical object, a shape of the physical object, an orientation of the physical object with respect to the device, a position of the physical object with respect to the device, an ability of the physical object to be held by a hand of a user, any combination thereof, and/or other attribute.

At block 1006, the process 1000 includes determining an input type based on the at least one attribute of the physical object. In one illustrative example, the input type includes a scrolling input. In another illustrative example, the input type includes a tap input. The input type can include other types of input, such as a wrist-based input (e.g., a user turning their wrist forward or backwards, etc.), a swipe-based input (e.g., a user providing a gesture swiping to the left, right, up, down, diagonally, etc.), and/or other input.

At block 1008, the process 1000 includes receiving input corresponding to the input type. At block 1010, the process 1000 includes controlling displayed virtual content based on the determined input type. In some examples, the process 1000 includes determining an input function for the input type based on the at least one attribute of the physical object. In one illustrative example, the input type includes a scrolling input, and the input function includes an orientation of the scrolling input. In such examples, the process 1000 can include controlling the displayed virtual content based on the determined input function for the input type.

In some examples, the process 1000 includes determining a body part of a user in one or more images, determining at least one attribute of the body part of the user in the one or more images, and determining at least one of the input type or an input function for the input type based on the at least one attribute of the physical object and the at least one attribute of the body part of the user. In some cases, the at least one attribute of the body part includes at least one of a size of the body part, an orientation of the body part relative to the physical object, a position of the body part relative to the physical object a position of the body part relative to the physical object, an orientation of the body part relative to the device, a position of the body part relative to the device, any combination thereof, and/or other attribute.

In some examples, the body part of the user is a hand of the user, and the at least one attribute of the body part includes at least one of a size of the hand, an orientation of the hand relative to the physical object, a position of the hand relative to the physical object, an orientation of the hand relative to the device, a position of the hand relative to the device, whether the hand is a left hand or a right hand of the user, any combination thereof, and/or other attribute.

In some examples, the process 1000 includes determining an interface layout for virtual content based on the at least one attribute of the physical object, and displaying the virtual content based on the determined interface layout.

In some examples, the processes described herein (e.g., the process 900, the process 1000, and/or other process described herein) may be performed by a computing device or apparatus. In one example, the process 900 and/or the process 1000 can be performed by the extended reality system 100 of FIG. 1. In another example, the process 900 and/or the process 1000 can be performed by the computing system 1100 shown in FIG. 11. For instance, a device with the computing system architecture shown in FIG. 11 can include the components of the extended reality system 100 of FIG. 1 and can implement the operations of FIG. 9 and/or FIG. 10.

The device or apparatus can be, can be a part of, or can include an extended reality device (e.g., a VR headset, an AR headset, AR glasses, a network-connected watch or smartwatch, or other wearable device). In some cases, The device or apparatus can be, can be a part of, or can include any other suitable device, such as a mobile device (e.g., a mobile phone), a desktop computing device, a tablet computing device, a wearable device (e.g., a smartwatch, etc.), a server computer, a vehicle or computing device or system of a vehicle, a robotic device, a television, and/or any other computing device with the resource capabilities to perform the processes described herein, including the process 900 and/or the process 1000. In some cases, the device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 and the process 1000 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900, the process 1000, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
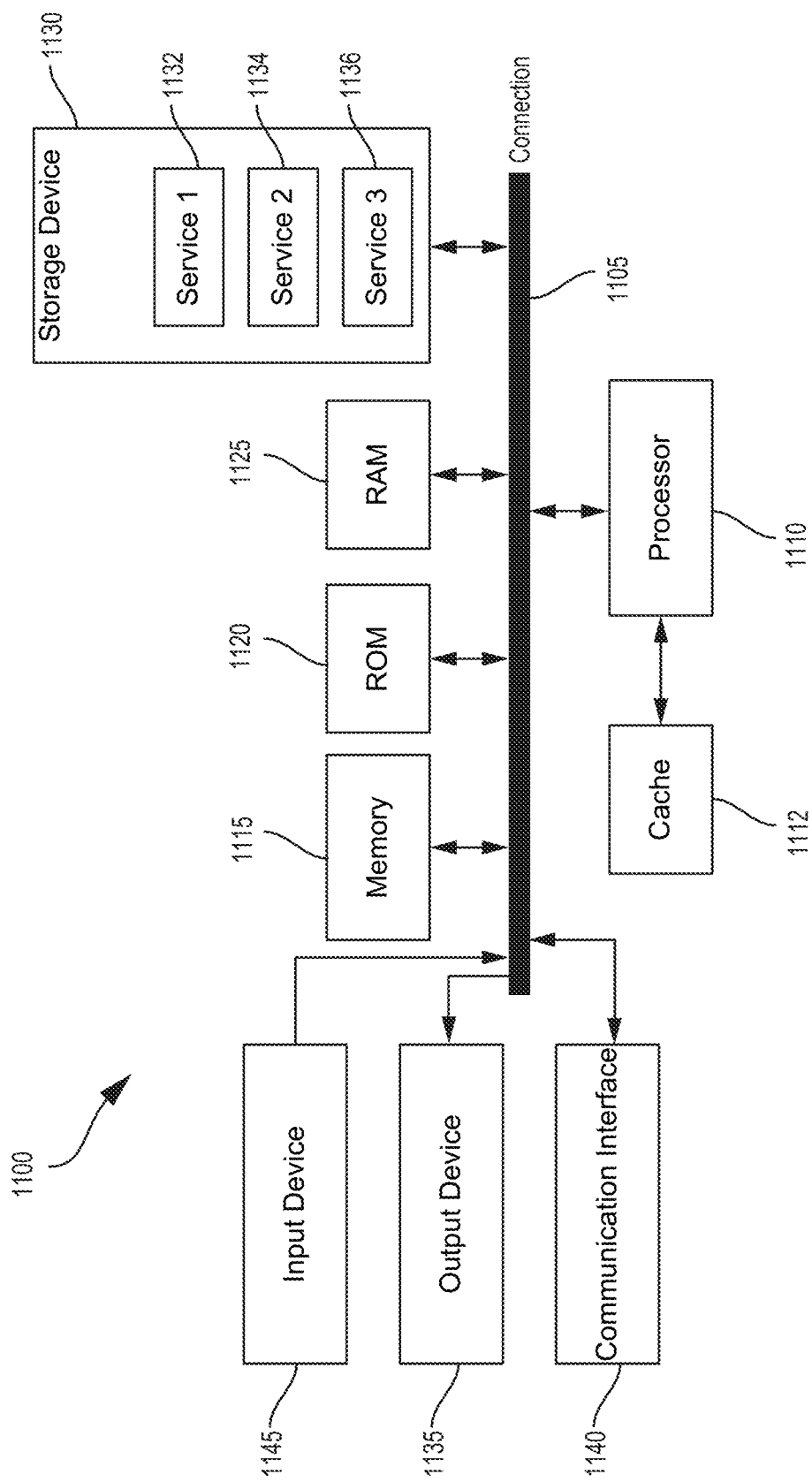
FIG. 11 is a diagram illustrating an example of a system for implementing certain aspects of the present disclosure.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1: An apparatus for optical flow estimation between one or more frames. The apparatus includes a memory (e.g., implemented in circuitry) and a processor (or multiple processors) coupled to the memory. The processor (or processors) is configured to: obtain an image of a physical object in a real-world environment; determine at least one attribute of the physical object in the image; determine an interface layout for virtual content based on the at least one attribute of the physical object; and cause the virtual content to be displayed based on the determined interface layout.

Example 2: The apparatus of example 1, wherein the real-world environment is viewable through a display of the apparatus as the virtual content is displayed by the display.

Example 3: The apparatus of any of examples 1 or 2, wherein the at least one attribute of the physical object includes at least one of a size of the physical object, a shape of the physical object, an orientation of the physical object with respect to the apparatus, a position of the physical object with respect to the apparatus, and an ability of the physical object to be held by a hand of a user.

Example 4: The apparatus of any of examples 1 to 3, wherein the one or more processors are configured to: determine a body part of a user in one or more images; determine at least one attribute of the body part of the user in the one or more images; and determine the interface layout for the virtual content based on the at least one attribute of the physical object and the at least one attribute of the body part of the user.

Example 5: The apparatus of example 4, wherein the at least one attribute of the body part includes at least one of a size of the body part, an orientation of the body part relative to the physical object, a position of the body part relative to the physical object a position of the body part relative to the physical object, an orientation of the body part relative to the apparatus, and a position of the body part relative to the apparatus.

Example 6: The apparatus of example 4, wherein the body part of the user is a hand of the user, and wherein the at least one attribute of the body part includes at least one of a size of the hand, an orientation of the hand relative to the physical object, a position of the hand relative to the physical object, an orientation of the hand relative to the apparatus, a position of the hand relative to the apparatus, and whether the hand is a left hand or a right hand of the user.

Example 7: The apparatus of any of examples 1 to 6, wherein the one or more processors are configured to: determine a hand of a user in one or more images; determine whether the hand is a left hand or a right hand of the user; and determine a position for the virtual content in the interface layout based on whether the hand is the left hand or the right hand of the user.

Example 8: The apparatus of example 7, wherein the one or more processors are configured to: determine the hand is the left hand of the user; determine, based on the hand being the left hand of the user, the position for the virtual content relative to a right side of the physical object; and display the virtual content in the interface layout relative to the right side of the physical object.

Example 9: The apparatus of example 7, wherein the one or more processors are configured to: determine the hand is the right hand of the user; determine, based on the hand being the right hand of the user, the position for the virtual content relative to a left side of the physical object; and display the virtual content in the interface layout relative to the left side of the physical object.

Example 10: The apparatus of any of examples 1 to 9, wherein the one or more processors are configured to: determine the at least one attribute of the physical object in a plurality of images.

Example 11: The apparatus of any of examples 1 to 10, wherein the one or more processors are configured to: determine an input type based on the at least one attribute of the physical object; receive input corresponding to the input type; and control the displayed virtual content based on the input type.

Example 12: The apparatus of example 11, wherein the input type includes a scrolling input.

Example 13: The apparatus of example 11, wherein the input type includes a tap input.

Example 14: The apparatus of example 11, wherein the one or more processors are configured to: determine an input function for the input type based on the at least one attribute of the physical object; and control the displayed virtual content based on the determined input function for the input type.

Example 15: The apparatus of example 14, wherein the input type includes a scrolling input, and wherein the input function includes an orientation of the scrolling input.

Example 16: The apparatus of any of examples 1 to 15, wherein the apparatus comprises an extended reality device.

Example 17: The apparatus of any of examples 1 to 16, further comprising a display configured to display the virtual content.

Example 18: The apparatus of any of examples 1 to 17, further comprising camera configured to capture one or more images.

Example 19: A method of generating virtual content. The method comprises: obtaining, by a device, an image of a physical object in a real-world environment; determining, by the device, at least one attribute of the physical object in the image; determining, by the device, an interface layout for virtual content based on the at least one attribute of the physical object; and displaying the virtual content based on the determined interface layout.

Example 20: The method of example 19, wherein the real-world environment is viewable through a display of the device as the virtual content is displayed by the display.

Example 21: The method of any of examples 19 or 20, wherein the at least one attribute of the physical object includes at least one of a size of the physical object, a shape of the physical object, an orientation of the physical object with respect to the device, a position of the physical object with respect to the device, and an ability of the physical object to be held by a hand of a user.

Example 22: The method of any of examples 19 to 21, further comprising: determining a body part of a user in one or more images; determining at least one attribute of the body part of the user in the one or more images; and determining the interface layout for the virtual content based on the at least one attribute of the physical object and the at least one attribute of the body part of the user.

Example 23: The method of example 22, wherein the at least one attribute of the body part includes at least one of a size of the body part, an orientation of the body part relative to the physical object, a position of the body part relative to the physical object a position of the body part relative to the physical object, an orientation of the body part relative to the device, and a position of the body part relative to the device.

Example 24: The method of example 22, wherein the body part of the user is a hand of the user, and wherein the at least one attribute of the body part includes at least one of a size of the hand, an orientation of the hand relative to the physical object, a position of the hand relative to the physical object, an orientation of the hand relative to the device, a position of the hand relative to the device, and whether the hand is a left hand or a right hand of the user.

Example 25: The method of any of examples 19 to 24, further comprising: determining a hand a user in one or more images; determining whether the hand is a left hand or a right hand of the user; and determining a position for the virtual content in the interface layout based on whether the hand is the left hand or the right hand of the user.

Example 26: The method of example 25, further comprising: determining the hand is the left hand of the user; determining, based on the hand being the left hand of the user, the position for the virtual content relative to a right side of the physical object; and displaying the virtual content in the interface layout relative to the right side of the physical object.

Example 27: The method of example 25, further comprising: determining the hand is the right hand of the user; determining, based on the hand being the right hand of the user, the position for the virtual content relative to a left side of the physical object; and displaying the virtual content in the interface layout relative to the left side of the physical object.

Example 28: The method of any of examples 19 to 27, further comprising: determining the at least one attribute of the physical object in a plurality of images.

Example 29: The method of any of examples 19 to 28, further comprising: determining an input type based on the at least one attribute of the physical object; receiving input corresponding to the input type; and controlling the displayed virtual content based on the input type.

Example 30: The method of any of examples 19 to 29, wherein the input type includes a scrolling input.

Example 31: The method of any of examples 19 to 30, wherein the input type includes a tap input.

Example 32: The method of any of examples 19 to 31, further comprising: determining an input function for the input type based on the at least one attribute of the physical object; and controlling the displayed virtual content based on the determined input function for the input type.

Example 33: The method of example, wherein the input type includes a scrolling input, and wherein the input function includes an orientation of the scrolling input.

Example 34: A computer-readable storage medium storing instructions that, when executed, cause one or more processors to perform any of the operations of examples 19 to 33.

Example 35: An apparatus comprising means for performing any of the operations of examples 19 to 33.

Example 36: An apparatus for generating virtual content comprising a memory and a processor (or multiple processors) coupled to the memory and configured to: obtain an image of a physical object in a real-world environment; determine at least one attribute of the physical object in the image; determine an input type based on the at least one attribute of the physical object; receive input corresponding to the input type; and control displayed virtual content based on the determined input type.

Example 37: The apparatus of example 36, wherein the real-world environment is viewable through a display of the apparatus as the virtual content is displayed by the display.

Example 38: The apparatus of any of examples 36 or 37, wherein the at least one attribute of the physical object includes at least one of a size of the physical object, a shape of the physical object, an orientation of the physical object with respect to the apparatus, a position of the physical object with respect to the apparatus, and an ability of the physical object to be held by a hand of a user.

Example 39: The apparatus of any of examples 36 to 38, wherein the input type includes a scrolling input.

Example 40: The apparatus of any of examples 36 to 38, wherein the input type includes a tap input.

Example 41: The apparatus of any of examples 36 to 40, wherein the one or more processors are configured to: determine an input function for the input type based on the at least one attribute of the physical object; and control the displayed virtual content based on the determined input function for the input type.

Example 42: The apparatus of example 41, wherein the input type includes a scrolling input, and wherein the input function includes an orientation of the scrolling input.

Example 43: The apparatus of any of examples 36 to 42, wherein the one or more processors are configured to: determine a body part of a user in one or more images; determine at least one attribute of the body part of the user in the one or more images; and determine at least one of the input type or an input function for the input type based on the at least one attribute of the physical object and the at least one attribute of the body part of the user.

Example 44: The apparatus of example 43, wherein the at least one attribute of the body part includes at least one of a size of the body part, an orientation of the body part relative to the physical object, a position of the body part relative to the physical object a position of the body part relative to the physical object, an orientation of the body part relative to the apparatus, and a position of the body part relative to the apparatus.

Example 45: The apparatus of example 43, wherein the body part of the user is a hand of the user, and wherein the at least one attribute of the body part includes at least one of a size of the hand, an orientation of the hand relative to the physical object, a position of the hand relative to the physical object, an orientation of the hand relative to the apparatus, a position of the hand relative to the apparatus, and whether the hand is a left hand or a right hand of the user.

Example 46: The apparatus of any of examples 36 to 45, wherein the one or more processors are configured to: determine an interface layout for virtual content based on the at least one attribute of the physical object; and cause the virtual content to be displayed based on the determined interface layout.

Example 47: The apparatus of any of examples 36 to 46, wherein the one or more processors are configured to: determine the at least one attribute of the physical object in a plurality of images.

Example 48: The apparatus of any of examples 36 to 47, wherein the apparatus comprises an extended reality device.

Example 49: The apparatus of any of examples 36 to 48, further comprising a display configured to display the virtual content.

Example 50: The apparatus of any of examples 36 to 49, further comprising camera configured to capture one or more images.

Example 51: A method of generating virtual content. The method comprises: obtaining, by a device, an image of a physical object in a real-world environment; determining, by the device, at least one attribute of the physical object in the image; determining, by the device, an input type based on the at least one attribute of the physical object; receiving, by the device, input corresponding to the input type; and controlling, by the device, displayed virtual content based on the determined input type.

Example 52: The method of example 51, wherein the real-world environment is viewable through a display of the device as the virtual content is displayed by the display.

Example 53: The method of any of examples 51 or 52, wherein the at least one attribute of the physical object includes at least one of a size of the physical object, a shape of the physical object, an orientation of the physical object with respect to the device, a position of the physical object with respect to the device, and an ability of the physical object to be held by a hand of a user.

Example 54: The method of any of examples 51 to 53, wherein the input type includes a scrolling input.

Example 55: The method of any of examples 51 to 53, wherein the input type includes a tap input.

Example 56: The method of any of examples 51 to 55, further comprising: determining an input function for the input type based on the at least one attribute of the physical object; and controlling the displayed virtual content based on the determined input function for the input type.

Example 57: The method of example 56, wherein the input type includes a scrolling input, and wherein the input function includes an orientation of the scrolling input.

Example 58: The method of any of examples 51 to 57, further comprising: determining a body part of a user in one or more images; determining at least one attribute of the body part of the user in the one or more images; and determining at least one of the input type or an input function for the input type based on the at least one attribute of the physical object and the at least one attribute of the body part of the user.

Example 59: The method of example 58, wherein the at least one attribute of the body part includes at least one of a size of the body part, an orientation of the body part relative to the physical object, a position of the body part relative to the physical object a position of the body part relative to the physical object, an orientation of the body part relative to the device, and a position of the body part relative to the device.

Example 60: The method of example 58, wherein the body part of the user is a hand of the user, and wherein the at least one attribute of the body part includes at least one of a size of the hand, an orientation of the hand relative to the physical object, a position of the hand relative to the physical object, an orientation of the hand relative to the device, a position of the hand relative to the device, and whether the hand is a left hand or a right hand of the user.

Example 61: The method of any of examples 51 to 60, further comprising: determining an interface layout for virtual content based on the at least one attribute of the physical object; and displaying the virtual content based on the determined interface layout.

Example 62: The method of any of examples 51 to 61, further comprising: determining the at least one attribute of the physical object in a plurality of images.

Example 63: The method of any of examples 51 to 62, wherein the device comprises an extended reality device.

Example 64: The method of any of examples 51 to 63, further comprising a display configured to display the virtual content.

Example 65: The method of any of examples 51 to 64, further comprising camera configured to capture one or more images.

Example 66: A computer-readable storage medium storing instructions that, when executed, cause one or more processors to perform any of the operations of examples 51 to 66.

Example 67: An apparatus comprising means for performing any of the operations of examples 51 to 66.

What is claimed is:

1. An apparatus for generating virtual content, comprising:
   a memory; and
   one or more processors coupled to the memory and configured to:
   obtain, from an image sensor, an image of a physical object in a real-world environment;
   determine, from the image, at least one attribute of the physical object in the image obtained from the image sensor;
   determine, from the image, a position of a first hand of a user of the apparatus holding the physical object;
   determine an interface layout for virtual content based on the at least one attribute of the physical object determined in the image and the position of the first hand holding the physical object;
   determine an input type for the virtual content and an input function for the input type based on the at least one attribute of the physical object determined in the image and the position of the first hand holding the physical object, the input type defining a scroll input and the input function defining a vertical direction for the scroll input;
   receive a user input, the user input comprising a scroll input in the vertical direction;
   cause the virtual content to be displayed relative to the physical object based on the determined interface layout and manipulated in the vertical direction based on the received user input;
   determine, from an additional image, the first hand of the user holding the physical object and a second hand of the user within a threshold distance of the virtual content displayed relative to the physical object; and
   determine at least one of an updated input type for controlling the virtual content or an updated input function for the input type based on determining the first hand of the user holding the physical object and the second hand of the user within the threshold distance of the virtual content, the updated input type defining a tap-based input and the updated input function defining a horizontal direction for the scroll input.

2. The apparatus of claim 1, wherein the real-world environment is viewable through a display of the apparatus as the virtual content is displayed by the display.

3. The apparatus of claim 1, wherein the at least one attribute of the physical object includes at least one of a size of the physical object, a shape of the physical object, an orientation of the physical object with respect to the apparatus, a position of the physical object with respect to the apparatus, or an ability of the physical object to be held by a hand of a user.

4. The apparatus of claim 1, wherein the one or more processors are configured to:
   determine a body part of a user in one or more images;
   determine at least one attribute of the body part of the user in the one or more images; and
   determine the interface layout for the virtual content based on the at least one attribute of the physical object and the at least one attribute of the body part of the user.

5. The apparatus of claim 4, wherein the at least one attribute of the body part includes at least one of a size of the body part, an orientation of the body part relative to the physical object, a position of the body part relative to the physical object, an orientation of the body part relative to the apparatus, or a position of the body part relative to the apparatus.

6. The apparatus of claim 4, wherein the body part of the user is the first hand of the user, and wherein the at least one attribute of the body part includes at least one of a size of the first hand, an orientation of the first hand relative to the physical object, an orientation of the first hand relative to the apparatus, a position of the first hand relative to the apparatus, or whether the first hand is a left hand or a right hand of the user.

7. The apparatus of claim 1, wherein the one or more processors are configured to:
- determine whether the first hand is a left hand or a right hand of the user; and
- determine a position for the virtual content in the interface layout based on whether the first hand is the left hand or the right hand of the user.

8. The apparatus of claim 7, wherein the one or more processors are configured to:
- determine the first hand is the left hand of the user;
- determine, based on the first hand being the left hand of the user, the position for the virtual content relative to a right side of the physical object; and
- display the virtual content in the interface layout relative to the right side of the physical object.

9. The apparatus of claim 7, wherein the one or more processors are configured to:
- determine the first hand is the right hand of the user;
- determine, based on the first hand being the right hand of the user, the position for the virtual content relative to a left side of the physical object; and
- display the virtual content in the interface layout relative to the left side of the physical object.

10. The apparatus of claim 1, wherein the one or more processors are configured to:
- determine the at least one attribute of the physical object in a plurality of images.

11. The apparatus of claim 1, wherein the apparatus comprises an extended reality device.

12. The apparatus of claim 1, further comprising a display configured to display the virtual content.

13. The apparatus of claim 1, further comprising a camera configured to capture one or more images.

14. A method of generating virtual content, the method comprising:
- obtaining, by a device from an image sensor, an image of a physical object in a real-world environment;
- determining, by the device from the image, at least one attribute of the physical object in the image obtained from the image sensor;
- determining, from the image, a position of a first hand of a user of the device holding the physical object;
- determining an interface layout for virtual content based on the at least one attribute of the physical object determined in the image and the position of the first hand holding the physical object;
- determining an input type for the virtual content and an input function for the input type based on the at least one attribute of the physical object determined in the image and the position of the first hand holding the physical object, the input type defining a scroll input and the input function defining a vertical direction for the scroll input;
- receiving a user input, the user input comprising a scroll input in the vertical direction;
- displaying the virtual content relative to the physical object based on the determined interface layout;
- manipulating the virtual content in the vertical direction based on the received user input;
- determining, from an additional image, the first hand of the user holding the physical object and a second hand of the user within a threshold distance of the virtual content displayed relative to the physical object; and
- determining at least one of an updated input type for controlling the virtual content or an updated input function for the input type based on determining the first hand of the user holding the physical object and the second hand of the user within the threshold distance of the virtual content, the updated input type defining a tap-based input and the updated input function defining a horizontal direction for the scroll input.

15. The method of claim 14, wherein the real-world environment is viewable through a display of the device as the virtual content is displayed by the display.

16. The method of claim 14, wherein the at least one attribute of the physical object includes at least one of a size of the physical object, a shape of the physical object, an orientation of the physical object with respect to the device, a position of the physical object with respect to the device, or an ability of the physical object to be held by a hand of a user.

17. The method of claim 14, further comprising:
- determining a body part of a user in one or more images;
- determining at least one attribute of the body part of the user in the one or more images; and
- determining the interface layout for the virtual content based on the at least one attribute of the physical object and the at least one attribute of the body part of the user.

18. The method of claim 17, wherein the at least one attribute of the body part includes at least one of a size of the body part, an orientation of the body part relative to the physical object, a position of the body part relative to the physical object, an orientation of the body part relative to the device, or a position of the body part relative to the device.

19. The method of claim 17, wherein the body part of the user is the first hand of the user, and wherein the at least one attribute of the body part includes at least one of a size of the first hand, an orientation of the first hand relative to the physical object, an orientation of the first hand relative to the device, a position of the first hand relative to the device, or whether the first hand is a left hand or a right hand of the user.

20. The method of claim 14, further comprising:
- determining whether the first hand is a left hand or a right hand of the user; and
- determining a position for the virtual content in the interface layout based on whether the first hand is the left hand or the right hand of the user.

21. The method of claim 20, further comprising:
- determining the first hand is the left hand of the user;
- determining, based on the first hand being the left hand of the user, the position for the virtual content relative to a right side of the physical object; and
- displaying the virtual content in the interface layout relative to the right side of the physical object.

22. The method of claim 20, further comprising:
- determining the first hand is the right hand of the user;
- determining, based on the first hand being the right hand of the user, the position for the virtual content relative to a left side of the physical object; and
- displaying the virtual content in the interface layout relative to the left side of the physical object.

23. The method of claim 14, further comprising:
- determining the at least one attribute of the physical object in a plurality of images.

24. The method of claim 14, wherein the device includes an extended reality device.

25. A non-transitory computer-readable medium of a device, the non-transitory computer-readable medium having stored thereon instructions that, when executed by one or more processors, cause the one or more processors to:
- obtain, from an image sensor, an image of a physical object in a real-world environment;

determine, from the image, at least one attribute of the physical object in the image obtained from the image sensor;

determine, from the image, a position of a first hand of a user of the device holding the physical object;

determine an interface layout for virtual content based on the at least one attribute of the physical object determined in the image and the position of the first hand holding the physical object;

determine an input type for the virtual content and an input function for the input type based on the at least one attribute of the physical object determined in the image and the position of the first hand holding the physical object, the input type defining a scroll input and the input function defining a vertical direction for the scroll input;

receive a user input, the user input comprising a scroll input in the vertical direction;

cause the virtual content to be displayed relative to the physical object based on the determined interface layout and manipulated in the vertical direction based on the received user input;

determine, from an additional image, the first hand of the user holding the physical object and a second hand of the user within a threshold distance of the virtual content displayed relative to the physical object; and determine at least one of an updated input type for controlling the virtual content or an updated input function for the input type based on determining the first hand of the user holding the physical object and the second hand of the user within the threshold distance of the virtual content, the updated input type defining a tap-based input and the updated input function defining a horizontal direction for the scroll input.

26. The non-transitory computer-readable medium of claim 25, wherein the real-world environment is viewable through a display of the device as the virtual content is displayed by the display.

27. The non-transitory computer-readable medium of claim 25, wherein the at least one attribute of the physical object includes at least one of a size of the physical object, a shape of the physical object, an orientation of the physical object with respect to the device, a position of the physical object with respect to the device, or an ability of the physical object to be held by a hand of a user.

28. The non-transitory computer-readable medium of claim 25, wherein the instructions, when executed by the one or more processors, cause the one or more processors to:
determine a body part of a user in one or more images;
determine at least one attribute of the body part of the user in the one or more images; and
determine the interface layout for the virtual content based on the at least one attribute of the physical object and the at least one attribute of the body part of the user.

29. The non-transitory computer-readable medium of claim 25, wherein the instructions, when executed by the one or more processors, cause the one or more processors to:
determine whether the first hand is a left hand or a right hand of the user; and
determine a position for the virtual content in the interface layout based on whether the first hand is the left hand or the right hand of the user.

30. The non-transitory computer-readable medium of claim 25, wherein the instructions, when executed by the one or more processors, cause the one or more processors to:
determine the at least one attribute of the physical object in a plurality of images.

* * * * *